United States Patent [19]

Sakamoto et al.

[11] Patent Number: 5,341,304
[45] Date of Patent: Aug. 23, 1994

[54] PRODUCTION PROCESS ADMINISTRATION SYSTEM

[75] Inventors: Shunji Sakamoto; Toshihiko Hoshino, both of Hiroshima, Japan

[73] Assignee: Mazda Motor Corporation, Hiroshima, Japan

[21] Appl. No.: 112,227

[22] Filed: Aug. 27, 1993

Related U.S. Application Data

[63] Continuation of Ser. No. 690,057, Apr. 23, 1991, abandoned.

[30] Foreign Application Priority Data

| Apr. 26, 1990 | [JP] | Japan | 2-110979 |
| Jun. 30, 1990 | [JP] | Japan | 2-173408 |
| Apr. 18, 1991 | [JP] | Japan | 3-086648 |

[51] Int. Cl.$^5$ .................................. G06F 15/46
[52] U.S. Cl. .................................. 364/468; 364/478; 364/552; 364/474.16
[58] Field of Search ............... 364/468, 469, 188, 478, 364/474.16, 507, 550, 551.01, 552; 235/375, 383; 414/134, 136; 29/568

[56] References Cited

U.S. PATENT DOCUMENTS

| 4,472,783 | 9/1984 | Johnstone et al. | 364/468 |
| 4,646,245 | 2/1987 | Prodel et al. | 364/468 |
| 4,821,198 | 4/1989 | Takeuchi et al. | 364/468 |
| 5,077,674 | 12/1991 | Tischle et al. | 364/468 |
| 5,086,397 | 2/1992 | Schuster et al. | 364/507 |
| 5,088,045 | 2/1992 | Shimanaka et al. | 364/468 |
| 5,197,172 | 3/1993 | Takagi et al. | 364/468 |
| 5,239,487 | 8/1993 | Horejsi et al. | 364/522 |
| 5,241,482 | 8/1993 | Iida et al. | 364/468 |

FOREIGN PATENT DOCUMENTS

| 61-108079 | 5/1986 | Japan . |
| 2232783 | 12/1990 | United Kingdom . |

OTHER PUBLICATIONS

German Office Action dated Jun. 29, 1992 with English Translation.

*Primary Examiner*—Jerry Smith
*Assistant Examiner*—Thomas E. Brown

[57] ABSTRACT

In a production process administration system, there are provided an assembly line comprising a plurality of assembly stations and a correction line comprising a plurality of correction stations for correcting defects which occur on the assembly line, the above two lines being connected in series to form a single production line. Defects detected in the assembly line are stored in a data carrier which is transported along with a work which is assembled. Defect data in the data carrier is read before the work enters the correction line, and correction operation instructions based on the read data are output to each station of the correction line.

18 Claims, 25 Drawing Sheets

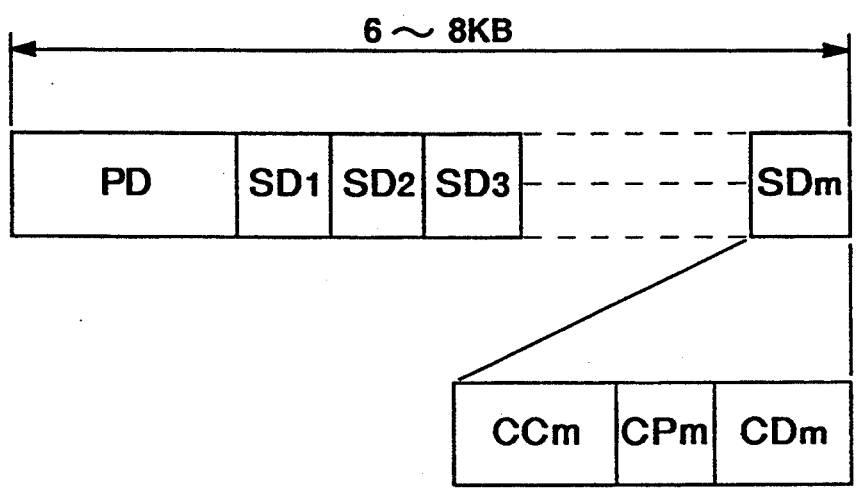
F I G. 11

| RCD 1 | WORK ID1 | WORK POS1 | TOOL ID1 | TM1 |
|---|---|---|---|---|
| RCD 2 | WORK ID2 | WORK POS2 | TOOL ID1 | TM2 |
| RCD 3 | WORK ID3 | WORK POS3 | TOOL ID1 | TM3 |
| RCD 4 | WORK ID4 | WORK POS4 | TOOL ID1 | TM4 |

FIG. 18

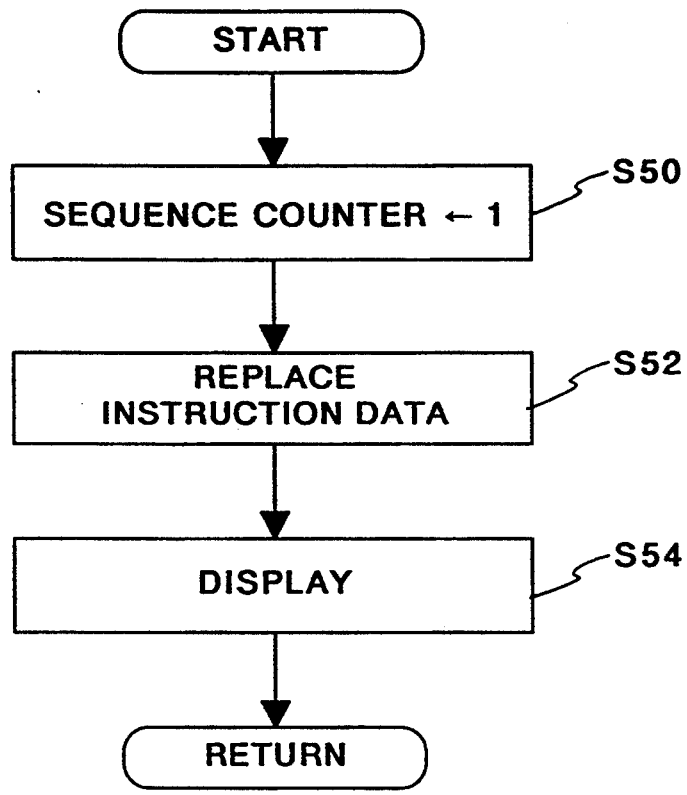
F I G. 22

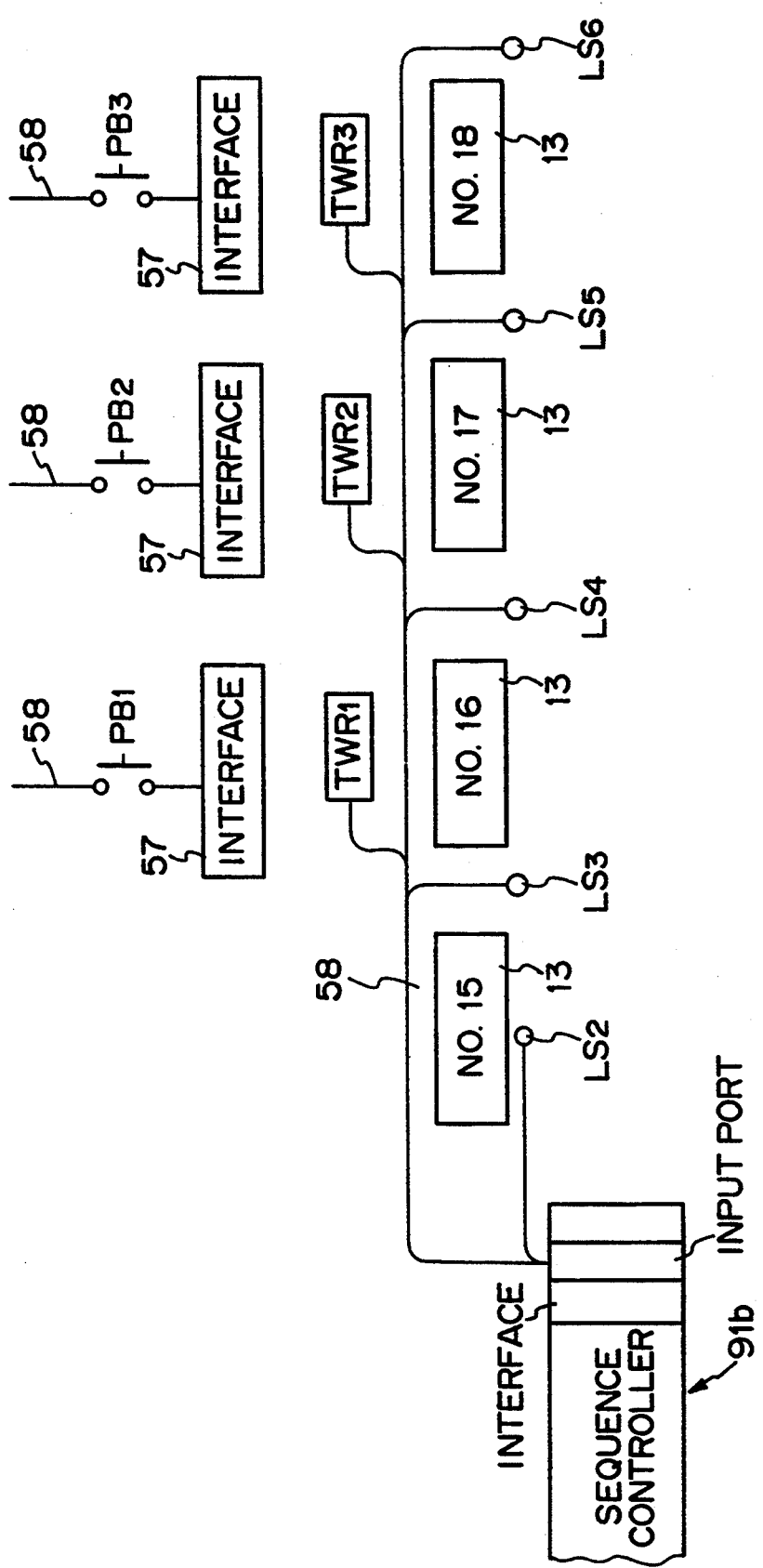
F I G. 24

PRODUCTION PROCESS ADMINISTRATION SYSTEM

This application is a continuation of application Ser. No. 07/690,057, filed Apr. 23, 1991, now abandoned.

BACKGROUND OF THE INVENTION

Field of the Invention

The present invention relates to a production process administration system which is comprised of an assembling line in which a plurality of assembling stations are positioned in a direction in which work is transported, and a correction line which has a plurality of correction stations for correcting defects which occur in the operations carried out by the assembling line and which are connected in series with the assembling line.

Description of the Related Art

In a production line, such as an automobile assembly line, subunits for sequence control having a computer are provided for various kinds of equipment devices (for example, NC apparatus for nut runners, weld robots, etc.) which are positioned in series. It is known in the prior art that operation processes are automated by performing sequence control corresponding to a work ID for an action, which each of the equipment devices should perform, in sequence from a host computer to such a subunit.

In a case where such sequence control is performed, sequence control programs stored in the memory of a sequence control unit of the host computer are loaded into said subunits. The subunit sequentially and logically executes in accordance with the sequence control program sent from the host computer. In a production line, such as an automobile assembly line, in which a plurality of equipment devices used for sequence control purposes are positioned for automation as described above, a predetermined operation is automatically performed on each work which is transported along the line in sequence by a plurality of equipment units used for the above-mentioned sequence control purposes in accordance with a series of operation processes.

In such a production line, there is a possibility that defects will occur as the result of an operation in each operation process. Therefore, in the above-mentioned production line in which a plurality of equipment devices for sequence control purposes are positioned for automation, an inspection line is usually needed. Such an inspection line is disclosed in Japanese Kokai No. Sho 61-108079. In this production line (inspection line) of the prior art, a mobile communication device is installed on a vehicle body as a work which moves along the line. Results of the inspection in each inspection process are communicated and written in a RAM in the communication device.

The above-mentioned defects, however, will not occur at all positions at which operations are performed by automatic apparatuses. In practice, provided that operations are performed at 100 positions by a robot at a certain assembling station, defects will occur at a few positions. Therefore, the provision of a special inspection line for the purpose of detecting a small number of these defects hinders the efficiency of a production line. That is, though it is important to provide an inspection line, like that disclosed in the Japanese Kokai No. Sho 61-108079, within a production line, a more important thing is that defects should be inspected and corrected without production efficiency being lowered.

An assembly line is provided so that sequence controls for assembly are performed along it. It is, therefore, difficult to correct defects at the positions in the line where they occur. Practically, most of such defects cannot be corrected without the intervention of humans. That is, to correct defects without lowering production efficiency, a correction line is needed separately from the assembly line.

As a consequence, a continuous line comprising an assembly line→inspection line→correction line is needed. However, it is undesirable to provide a special inspection line for defects which occur infrequently. Therefore, a continuous production line comprising an assembly line→correction line which excludes an inspection line has been considered. However, such a production line has problems described below.

Since defects occur at assembling stations of the actual assembly line, if a special inspection line as in the above-mentioned prior art is not provided, defects which occur in the assembly line can be detected and the type of such defects can be identified only within the assembly line. Therefore, how data on defects detected in the assembly line should be conveyed to the correction line becomes an important matter.

As for techniques for detecting defects and conveying data thereof to the correction line, the following can be considered.

In the above-mentioned conventional production line which is controlled sequentially, that is, in a production line in which a computer system for controlling the entire production plan is provided in the center thereof and a corresponding subunit for sequence control is provided in each assembling station, operation status data indicating an operation result is formed in a subunit which corresponds to each equipment device. This operation result data formed in a sequence control subunit is temporarily collected in the central system that centrally controls each sequence control unit via a communication line, and then the data is analyzed by this central system. When a defective place is detected by the central system as a result of the analysis, data on the detected defects can be sent out from the central system to data reception units installed in correction stations via a communication line.

However, when data processing is carried out among data reception units in the sequence control units, as the number of equipment devices installed in the production line for sequence control purposes and sequence control units corresponding to them increase, the amount of data to be processed by them increases sharply, and the central system and correction stations take a long time to process data. Also, the number of data processing errors increase sharply. As a consequence, there is a danger that the efficiency of a correction operation for a work at the correction station will be decreased and accuracy degraded.

SUMMARY OF THE INVENTION

Accordingly, an object of the present invention is to transmit the presence of defects which occur on an assembly line to a correction line efficiently and reliably together with the contents of the defects.

In the above-mentioned correction line, a plurality of correction stations are usually disposed sequentially in correspondence with a plurality of sequence control equipments. However, in a case where such a plurality of correction stations are disposed, the problems described below will arise.

That is, each correction station has a length (e.g., approximately 4 m) corresponding to a work-piece (an automobile body, e.g.). For this reason, it is impossible to correct at one correction station correction points over the entire vehicle body from the front end to the back end thereof, since the range in which an operator moves becomes too wide. As an inevitable consequence, a correction system in which it can be determined which of the positions of the defects of the workpiece should be corrected by which correction station and the correction of the defects are shared with the stations is proposed.

Accordingly, another object of the present invention is to propose a production process administration system which is capable of accurately distributing correction operations to a plurality of correction station according to a correction operation.

A further object of the present invention is to propose a production process administration system in which a plurality of correction stations are disposed in the correction line, in a case where any correction operation is not finished properly at any one of the correction stations the correction operations were distributed to, which system is capable of re-distributing a re-constructed correction operations to the subsequent correction stations.

In such a correction station as described above, a plurality of tools used for performing a correction operation are used. For example, for a correction work such as a screw fastening, a plurality of torque wrenches having different torque values are provided. From the viewpoint of improvements in work efficiency, it is desirable that an operator change tools as little as possible.

Accordingly, still a further object of the present invention is to propose a production process administration system which is capable of efficiently performing a correction operation at a correction station.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 11 is a view showing the structure of data stored in a data carrier 60;

FIG. 18 is a view showing a method of preparing instruction data in the R/D unit 53;

FIGS. 21 through 23 are each a flowchart showing a sequence of control in the correction station; and FIGS. 24 and 25 are each a view showing the technique of transferring data in a modification.

DESCRIPTION OF THE PREFERRED EMBODIMENTS

Figure 1:
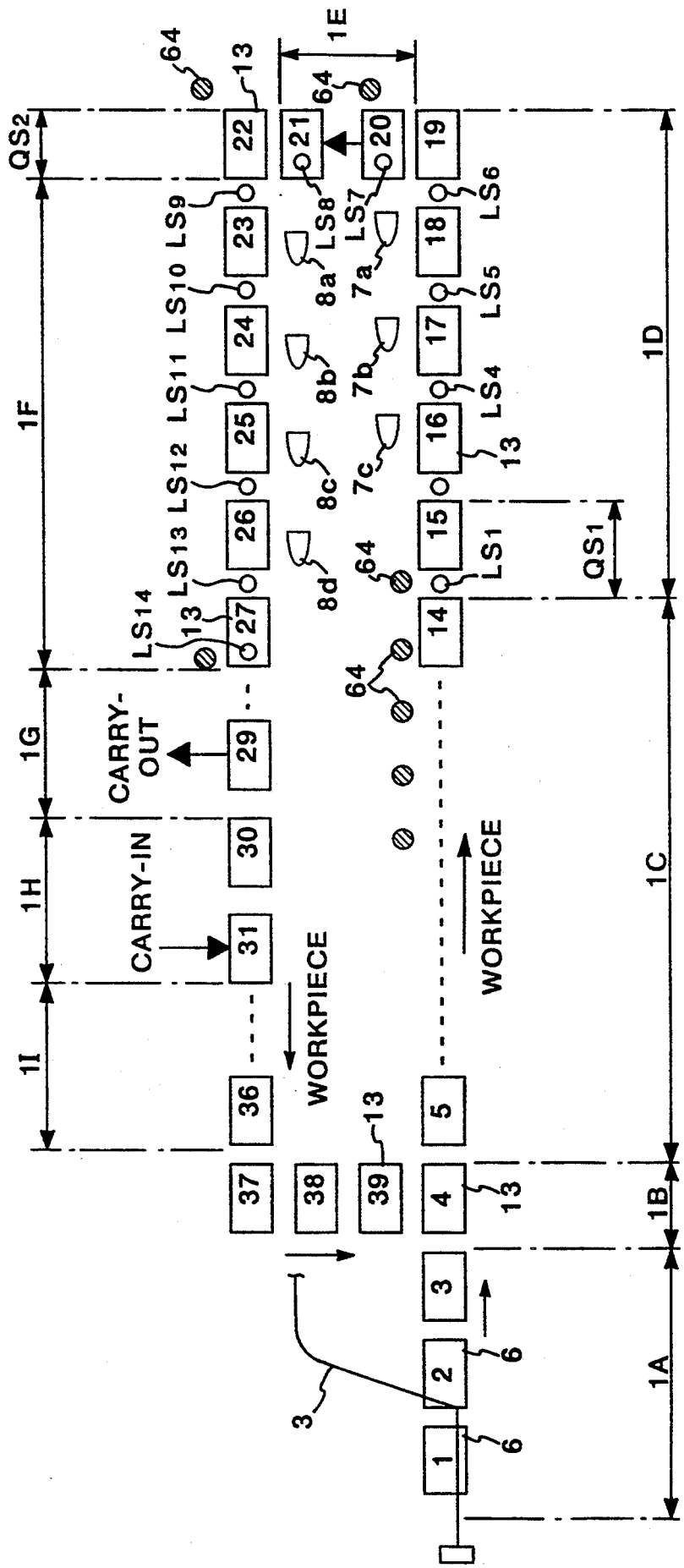
FIG. 1 is a schematic block diagram showing the system configuration of a whole automobile production line of an embodiment of the present invention.

An embodiment to which the present invention is applied, an assembly line for automobiles, will be explained hereinbelow with reference to the accompanying drawings.

Features of the Embodiment System

Features of a production line which are typical of the automobile manufacturing industry, though not limited to the automobile industry, are that a plurality of assembly lines, such as an engine production line, a body production line, a body painting line, and an assembly line in which engines are assembled to the automobile body, are integrated into a unit and automobiles are produced continuously. One company may have a plurality of factories or only one factory. The production planning of the company in its entirety is controlled by a central computer system, and one factory of the company in its entirety is controlled by a computer exclusively used for the factory or by the above central computer system. A plurality of production lines in their entirety installed in such factory forms one or more continuous lines.

Features of the present embodiment are:

① An individual production line is comprised of an assembly operation line and a correction operation line. The correction operation line is successively connected to the assembly operation line, and the operation of correcting defects which have occurred in the assembly line is performed. Defects which have occurred in the assembly line are corrected, if possible, within the confines of the same production line, in other words, without the help of the central system. The correction operation system of the present embodiment is of the type to be called a decentralized type, whereas that of a conventional correction operation system is of a centralized control type. For this reason, in this decentralized system, information on defects which have occurred in the assembly operation line, i.e., information on a work in which a defect has occurred or defect information on the position at which a defective work has occurred, is temporarily stored in a data carrier which moves along with the moving work, at a station (a plurality of stations exist in the assembly operation line) where the defect has occurred. Defect information is read from this data carrier just before entering the correction operation line. On the basis of this information, an operator is instructed that the correction operation should be performed by using what tools at which station of the correction operation line (a plurality of stations exist also in the correction operation line).

② The second feature is that a non-contact type data carrier is used, information on defects is transmitted to this data carrier or information on defects is read from the data carrier. In the present system, as a transmission system, microwaves are chosen from the viewpoint of resistance to noise and transmission distance performance.

③ Thirdly, CRT display devices are disposed in the correction stations. An operator is informed of the positions of defects and the kinds of tools to be used, the sequence of the correction operation, etc. from the system. In other words, the operator receives, at a glance, concrete instructions regarding the steps to be taken for defects.

④ Fourthly, the present embodiment deals with the so-called problem of "go-after another". A problem encountered in the case where a person is working on an assembly-line is that he may enter the area of another worker without noticing (this is "go-after another"). Therefore, in the present system where the contents of the correction operation are displayed on the display screen, the system must switch the screen from an operation indication for the previous work to that for the next work to let the operator know that the next work has arrived so that this "go-after another" will not occur. However, since an operator has an individual speed of performing work, a screen is not changed in the same manner, but a screen is changed after a lapse of a predetermined time period ($t_c$) since the next work enters his area.

⑤ The system determines the sequence of executions of correction operations for the purpose of improving the efficiency of the correction operation. The detection of the completion of an individual correction operation has been automated, if it can be automated. In this system, a torque wrench is used as an example of a correction operation tool. The completion of a correction operation by a torque wrench can be automated by detecting the change in load applied to the torque wrench. As for a correction operation of which the detection of completion cannot be automated, an operator notifies the completion of the correction operation to this system by pressing a completion confirmation button. The reason why the detection of completion can be automated is that the sequence of the correction operation is determined by the system.

More specifically, since the system knows where the station at which a correction operation is finished next is, it recognizes that a completion signal or the depression of the completion confirmation button actually indicates the completion of a particular correction station. Hence, the problem is how to synchronize the screen switching explained in ④ with the detection of the completion of individual correction operations. The biggest problem of not being capable of performing this synchronization is that a portion where the correction operation is not actually performed is erroneously recognized to be a completion. Hence, in this system, the input of the above correction operation completion signal is inhibited during a predetermined time period ($t_s$) since the screen is switched.

The present system has various kinds of features in addition to the above-mentioned points of ① to ⑤. Those features will become clear from the configuration and operation of the present system which will be described below in detail.

The present system being as briefly described above, the features of the present embodiment should be understood starting with the understanding of the automobile production line, in particular, the relationships between the assembly line and the correction operation line.

Automobile Assembly Line

FIG. 1 shows the overall configuration (layout of equipment) of an automobile assembly line 1 in the present embodiment.

The automobile assembly line 1 of the present embodiment is a final assembly line for automobile bodies. More specifically, in this assembly line, automated operations of fastening an assembly, such as engines, suspensions, fuel tanks, or radiators, by using e.g., a nut runner with a screw fastening member such as bolts, and correction operations of correcting defects which have occurred during the automated operation, are performed, on the body of an automobile which is suspended by a suspension means, such as a hanger frame, and is transported.

More specifically, the automobile assembly line 1 broadly comprises groups of a plurality of assembling stations described below, as will be understood from FIG. 1:

(1) A station group 1A (comprised of stations #1 to #3) in which automobile bodies are brought in and placed in position;

(2) A station group 1B (comprised of stations #4, and stations #37 to #39) into which assembly parts, such as engines or suspensions, are brought in.

(3) A station group 1C (comprised of stations #5 to #14) in which automatic assembly operations by robots are performed;

(4) A Correction station group 1D (comprised of stations #15 to #19), in which correction operations mainly on the upper portion of an automobile body are performed as the first backup correction line utilizing human workers;

(5) An auxiliary assembling station group 1E (comprised of stations #20 to #21) in which an operation mainly on the upper portion of an automobile body, such operations as disposing and stretching an interior ceiling cover, is performed;

(6) A correction station group 1F (comprised of stations #22 to #27) in which correction operations mainly on the lower portion of an automobile body are performed as the second backup correction line also utilizing human workers;

(7) A station group 1G (comprised of stations #28 to #29) in which assembly-finished automobile bodies are sent back;

(8) A station group 1H (comprised of stations #30 to #31) in which an operation of mounting a subpallet, one of the assembly parts, is performed; and (9) A station group 1I (comprised of stations #32 to #36) in which an operation of adjusting parts is performed.

Stations of #1 to #39 shown in FIG. 1 are not rigidly grouped. These stations indicate only approximate positions for an operator.

Positioning Station Group 1A

Group 1C for robot operations is preceded by group 1A in which an automobile body is placed and group 1B in which components are brought in for assembly purposes. In group 1A, an automobile body 6 which is moved along a guide rail 3a in a switchback fashion in the direction shown in FIG. 1, is first brought into station #1. The guide rail 3a is used for bringing in automobile bodies in an overhead type automobile body transport line 3. When the body 6 is brought into this stage, it may, for example, be painted, but may not yet be fully assembled, missing such components as engines, suspensions, fuel tanks, radiators, struts, sliding group, and interior ceilings.

Figure 2:
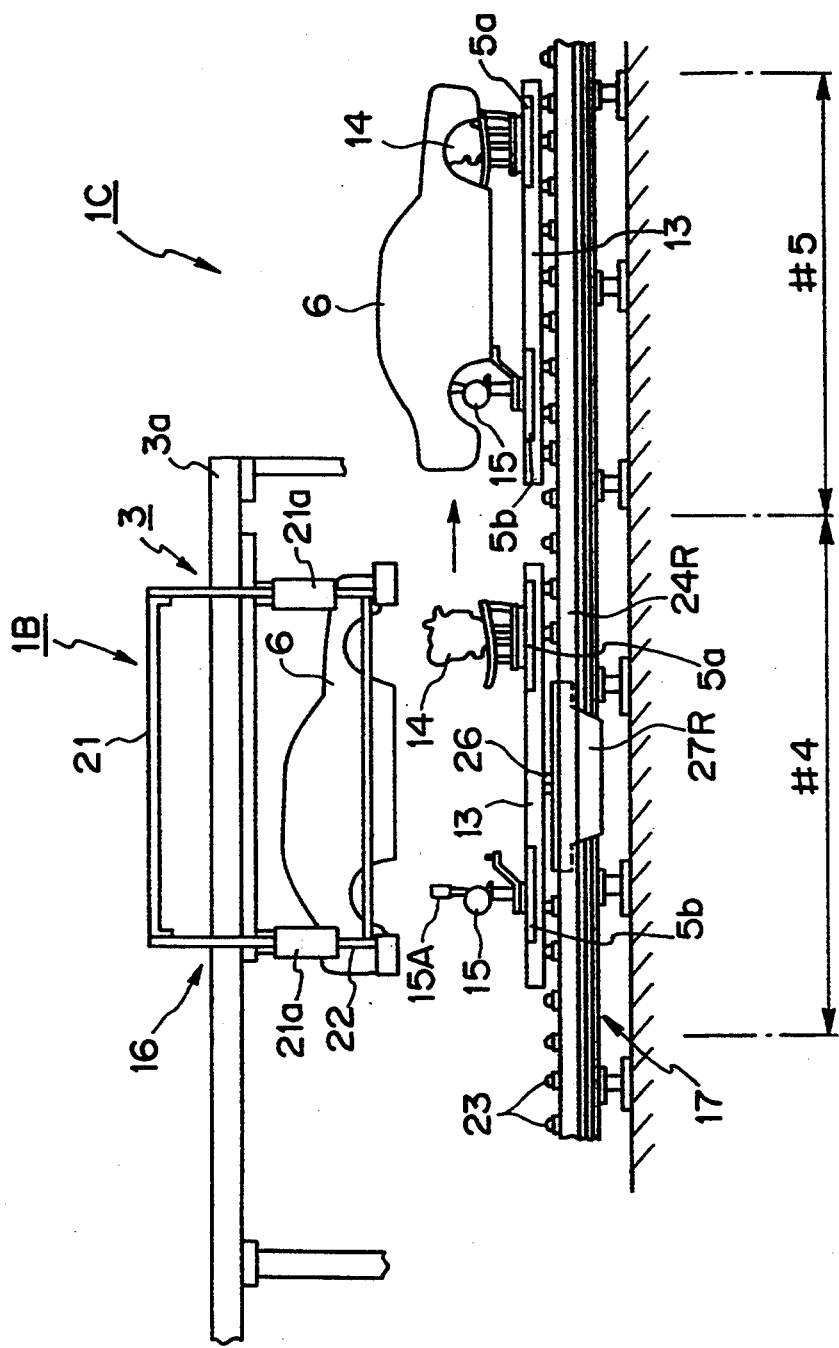
FIG. 2 is a schematic view showing a scene in which a body of an automobile is docked with parts to be assembled at a station of the production line.

Referring to FIGS. 1 and 2, the body 6 is transported to the position of station #1 on the positioning station group 1A, in a state in which it is suspended by an elevator type hanger frame 21, equipped with elevator cylinders 21a and 21a on the guide rail 3a for carrying in automobile bodies and which is utilized in the overhead type automobile body transport line 3. Thereafter, the body 6 is dropped down and mounted on a lifter (not shown) during the transfer from station #1 to station #2, and thereafter moves to station #3. An accurate positioning and the positioning state of the automobile body on the lifter are performed at this position. Then, the body 6 is transported to station #4 of the assembly parts carry-in station group 1B of the next stage in a manner in which this lifter is lifting it.

Carry-in Station Group 1B

Installed in subpallets 5a and 5b (FIG. 2) which assemble in station #4 is a work which has been installed in the subpallet installation station group 1H and is adjusted in the parts correction station 1I. That is, prior to the assembly in this station #4, an engine 14 with a front suspension assembled in the subpallet installation station group 1H has been installed in the subpallet 5a. A rear suspension 15 is installed in the subpallet 5b. For these works, the positions of the installed parts, etc. are accurately adjusted in the subsequent parts correction station 1I. These subpallets are installed in the work pallet 13 (main pallet) for transporting works and join the body 6 at station #4. More specifically, as shown in FIG. 2, in station #4, the body 6 which is suspended by the hanger frame 21 arrives in the direction from left to right in the figure. The engine 14 and the rear suspension 15 which are installed in the pallet 13 move in a vertical direction in FIG. 2 and reach station #4.

Figure 3:
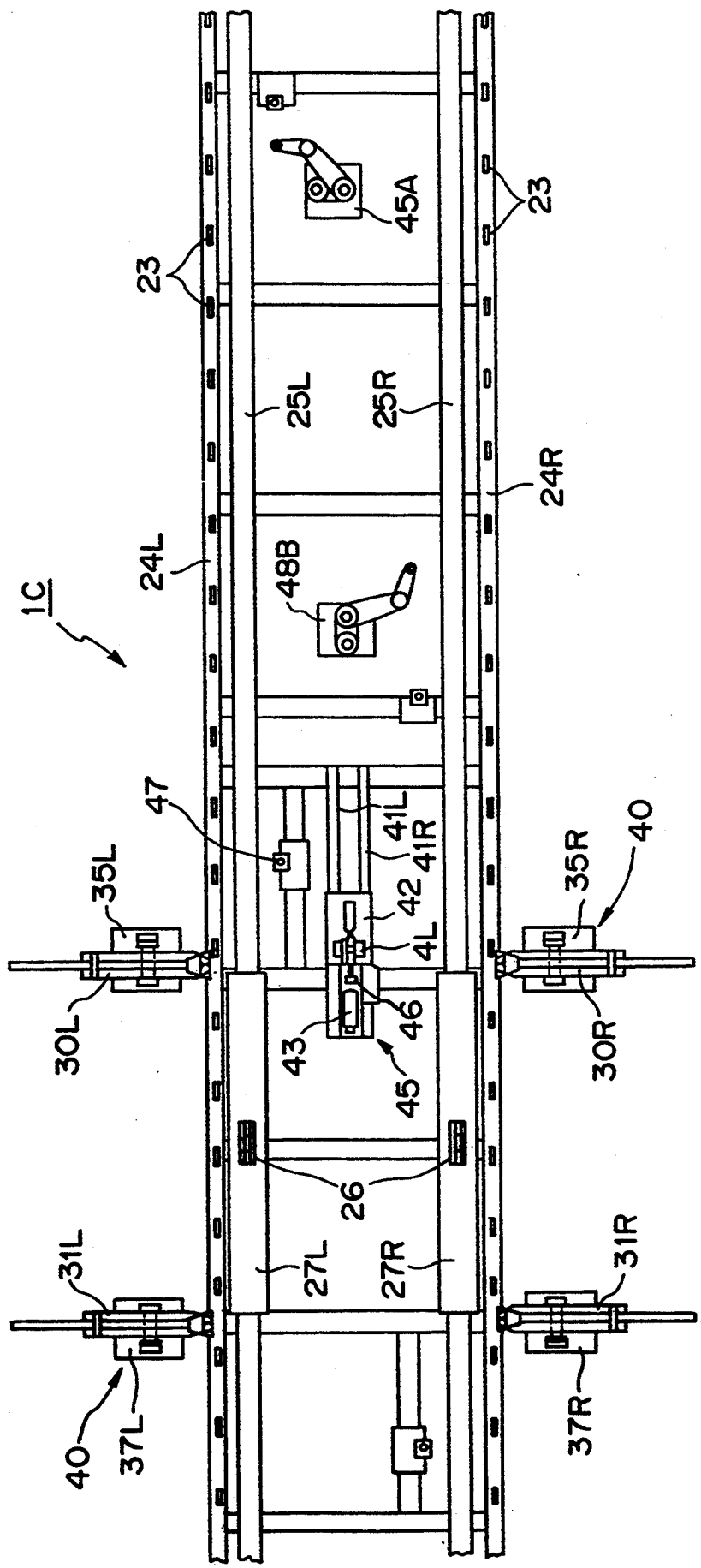
FIG. 3 is a top view of the station of FIG. 2.

The automobile assembly line 1 subsequent to the carry-in station group 1B comprises the work pallet 13 and a work pallet transport apparatus 17 that transports the work pallet 13, as shown in FIGS. 2 and 3. The work pallet transport apparatus 17 is comprised of a pair of guide sections 24L and 24R, on right and left, equipped with a number of support rollers 23 . . . that support the bottom surface of the above work pallet 13 on the top side thereof, and a pair of transport rails 25L and 25R set in parallel along the guide sections 24L and 24R, and a pair of pallet transport beds 27L and 27R, on the right and left, each of which has a pallet locking section 26 for locking the work pallet 13 and which is arranged to move freely along the transport rails 25L and 25R, respectively, and a linear motor mechanism (not shown) for driving the pallet transport beds 27L and 27R along the transport rails 25L and 25R, respectively.

Automatic Assembly Station Group 1C

As described above, the work pallet 13 with the engine 14 and the rear suspension 15 mounted thereon is carried onto the lower side of station #4 of the carry-in station group 1B in synchronization with the body 6 in the upper side of station #4. The body 6 is dropped down by the lifter at station #5, the first assembling station of the subsequent automatic assembly station group 1C. Then, the body 6 is removed from the lifter and, as shown in FIG. 2, the parts are accurately installed into the automobile bodies 6. This is shown on the right side of the figure.

Disposed in each station of the automatic assembly station group 1C are a pair of front clamp arms 30L and 30R on the right and left sides (FIG. 3) and a pair of back-side clamp arms 31L and 31R, each supporting a front-suspension strut (not shown) and a rear-suspension strut 15A (FIG. 2), respectively, so as to make them ready for assembly. The front clamp arms 30L and 30R of the right and left sides are placed so as to be movable, for example, back and forth and side to side, in a state in which their front end sections are locked to the front-suspension struts in fixed bases 35L and 35R, respectively. The back clamp arms 31L and 31R of the right and left sides are formed so as to be movable back and forth and side to side, in a manner in which their front end sections are locked to the rear-suspension struts 15A in fixed bases 37L and 37R, respectively. Thus, front clamp arms 30L and 30R of the right and left sides and the back clamp arms 31L and 31R of the right and left sides form the docking apparatus 40.

In addition, disposed in each station is a sliding apparatus 45 which is comprised of a pair of slide rails 41L and 41R positioned so as to extend parallel to transport rails 25L and 25R, respectively; a movable member 42 that slides along the slide rails 41L and 41R; and a motor 43 for driving the movable member 42. Disposed in the movable member 42 of the sliding apparatus 45 is a locking means 46 which locks to a movable engine support member (not shown) disposed on the work pallet 13. The sliding apparatus 45 causes the pallet 13 to move back and forth in a manner in which the locking means 46 is locked to the movable engine support member (not shown) on the work pallet 13. The work pallet 13 is placed in position by an elevator pallet reference pin 47 when the engine 14 (disposed on the work pallet 13), the front suspension (not shown), and the rear suspension 15 are assembled in the body 6, which is supported by the elevator type hanger frame 21 of the overhead type transport apparatus 16. As a result, the engine 14 is made to move back and forth in relation to the body 6 so that an interference between the body 6 and the engine 14 is avoided.

In addition, disposed in each of the assembly stations are robots 48A that perform an operation of fastening bolts or screws to the engine 14 and the front suspension (not shown) assembled in the body 6 and robots 48B that similarly perform an operation of fastening bolts or screws to the engine 14 and the rear suspension 15 assembled in the body 6.

Automobile bodies 6, on which parts have been assembled by the work pallet 13, are transported one after another to each assembling station of the assembling station group 1C, #5 to #14 at predetermined time intervals.

The automatic assembly station group 1C constructed as described above has, for example, nine (9) unit assembling stations, #6 to #14 (in FIG. 1, stations from #6 to #13 are not shown) as well as the above station #5. In the automatic assembly station group 1C, bolt fastening operations by using various kinds of automatic apparatus like a nut runner are performed in sequence by using the above-mentioned robot: a docking operation (#5) of docking assembly parts with the body 6; a bolt fastening operation (#6) on an engine or front suspension mount; a bolt fastening operation (#7) for mounting a fuel tank; a bolt fastening operation (#8) for mounting a strut; a bolt fastening operation (#10) for mounting a rear combination lamp, radiator, or the like; a bolt fastening operation (#11) for mounting a sliding group, or the like.

After the automatic assembly group 1C, are the station groups 1D and 1F in which corrections are made of the assembly operations performed in group 1C. In the stations of 1D, corrections are performed on the upper portion of automobile bodies are performed, and in the stations of 1F, corrections are made on the lower portion thereof. Group 1E for auxiliary operations lies between groups 1D and 1F. Group 1G performs the function of sending back automobile bodies (on which correction operations have been performed) to a predetermined place.

A robot apparatus at each assembly station that performs an operation of fastening nuts or bolts stops the operation when a fastening torque abnormality is detected, and records the position at which the abnormality has occurred. This point will be explained in detail in conjunction with a data carrier which is an apparatus for storing defect information.

Upper-Portion CORRECTION STATION Group 1D

Figure 4:
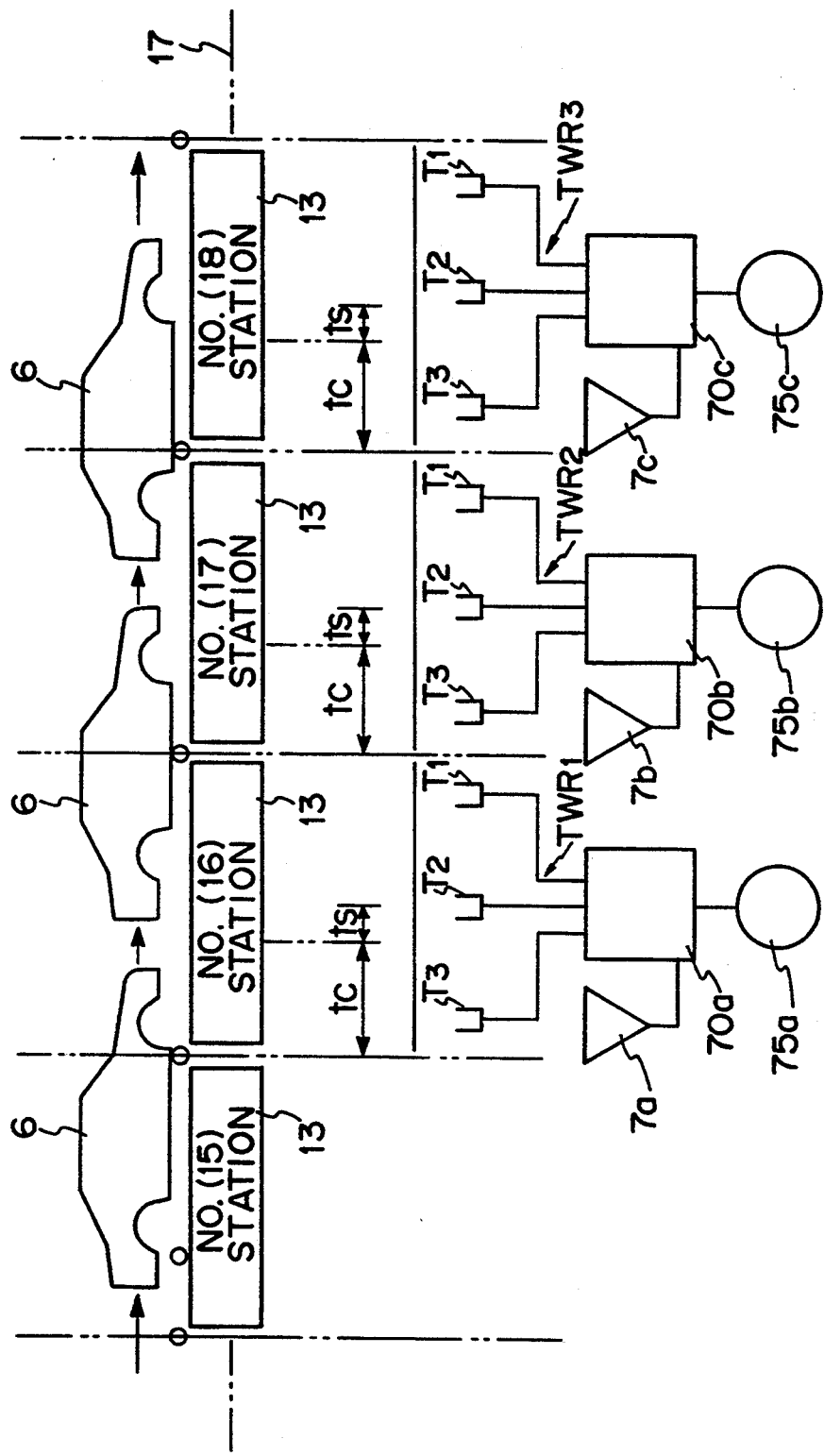
FIG. 4 is a block diagram showing the configuration of a group of stations by means of which a correction operation on the upper portion of an automobile body is performed.

This upper-portion correction station group 1D has five unit assembling stations of #15 to #19, as shown in FIGS. 1 and 4. The respective assembling stations #16, #17, and #18 are provided with: the respective controllers 70a to 70c for graphically controlling and displaying the content of correction instructions on the basis of the correction instructions (this has been prepared by a distribution unit 53a (which will be described later) on the basis of defect data accumulated by each station of the assembling station group 1C; the respective CRTs 7a, 7b, 7c for displaying the graphics; and a first to third torque wrench units $TWR_1$ to $TWR_3$ which are three-in-a-set. A correction operation of fastening bolts is performed with an increasing force on the basis of the display contents of CRTs 7a, 7b, and 7c.

Figure 5:
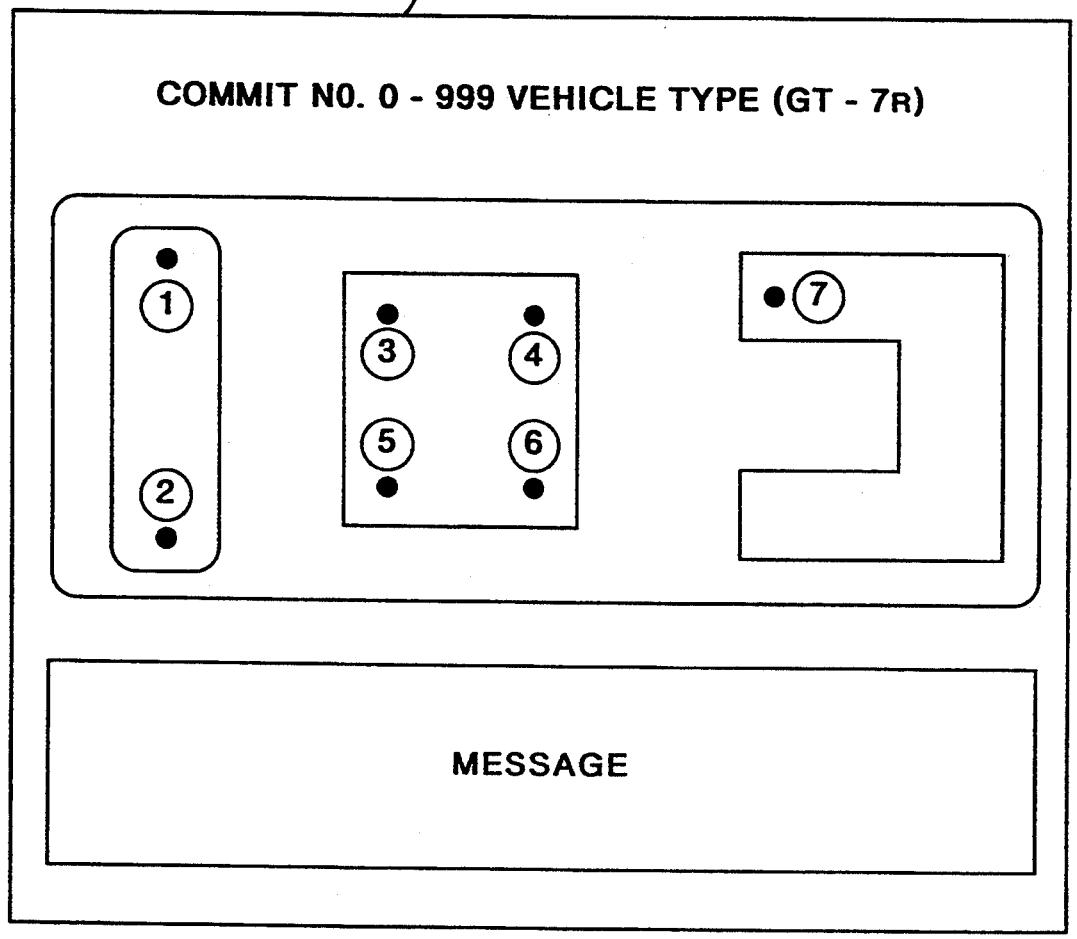
FIG. 5 is a schematic view showing the display mode of a display device 7 of a correction station.

The following are displayed, as defect information, on CRT's 7a to 7c, for example, as shown in FIG. 5:
 ①: Commitment # and type of automobile
 ②: Graphic display of an assembly in which defects have occurred, and the occurrence position thereof
 ③: Various messages regarding the defects.

Reference characters $LS_1$ to $LS_6$ denote limit switches (FIGS. 1 and 12) which detect the arrival of work pallets 13, 13 . . . at the above stations #15 to #19. Since a correction operation is performed manually by an operator at the correction station, the detection of the arrival of the work pallets 13, 13 . . . is needed for the purpose of notifying the operator.

When each of these limit switches $LS_3$ to $LS_5$ is turned on, this indicates that a new body 6 has arrived at the respective station. It follows that the display screen of a display CRT of a corresponding correction station should be switched to a display of the new automobile body at the same time each of the limit switches $LS_3$ to $LS_5$ is turned on. However, this switching is delayed because a disadvantage caused by the above-mentioned "go-after another" needs to be eliminated. This point will be described later in detail with reference to FIG. 20.

In the present embodiment, as shown in FIG. 4, a predetermined time period $t_c$ is set during a period from when each of the limit switches $LS_3$ to $LS_5$ is turned on to when the display screen of the CRTs 7a to 7c is actually switched. Furthermore, control is made so that checking whether or not the correction operation using the torque wrench units $TWR_1$ to $TWR_3$ have been finished is disabled for a predetermined time period $t_s$ after the above predetermined time period $t_c$ has elapsed. This control, for example, with respect to the torque wrench unit $TWR_1$ at station #16, is performed in such a manner that the torque wrench unit $TWR_1$ enters a disabled state while the above station #16 or station #17 is within the above time period ts.

As shown in FIG. 4, three torque wrenches at each station are connected to display controllers 70a to 70c, respectively. These controllers 70a to 70c control to display correction operation instructions shown in FIG. 5 on the basis of information sent from the defect data R/D unit 53 which will be described later. Encoders 75a to 75c connected to the display controllers 70a to 70c at each correction station detect the position of the pallet 13 carried into the correction station. At each correction station, as regards the pallet 13, the above encoder is initialized at the time each of the limit switches $LS_3$ to $LS_5$ is energized and detects the amount of the movement of the pallet since that time.

Auxiliary Operation Station Group 1E

The auxiliary operation station group 1E comprises, for example, two unit assembling stations of #20 and #21. A finishing-touch-like final assembly operation premising the completion of a correction operation on the upper portion of an automobile body, such as the disposing and stretching of a top ceiling inside an automobile is performed in the station group.

Lower-portion Correction Operation Station Group 1F

Figure 6:
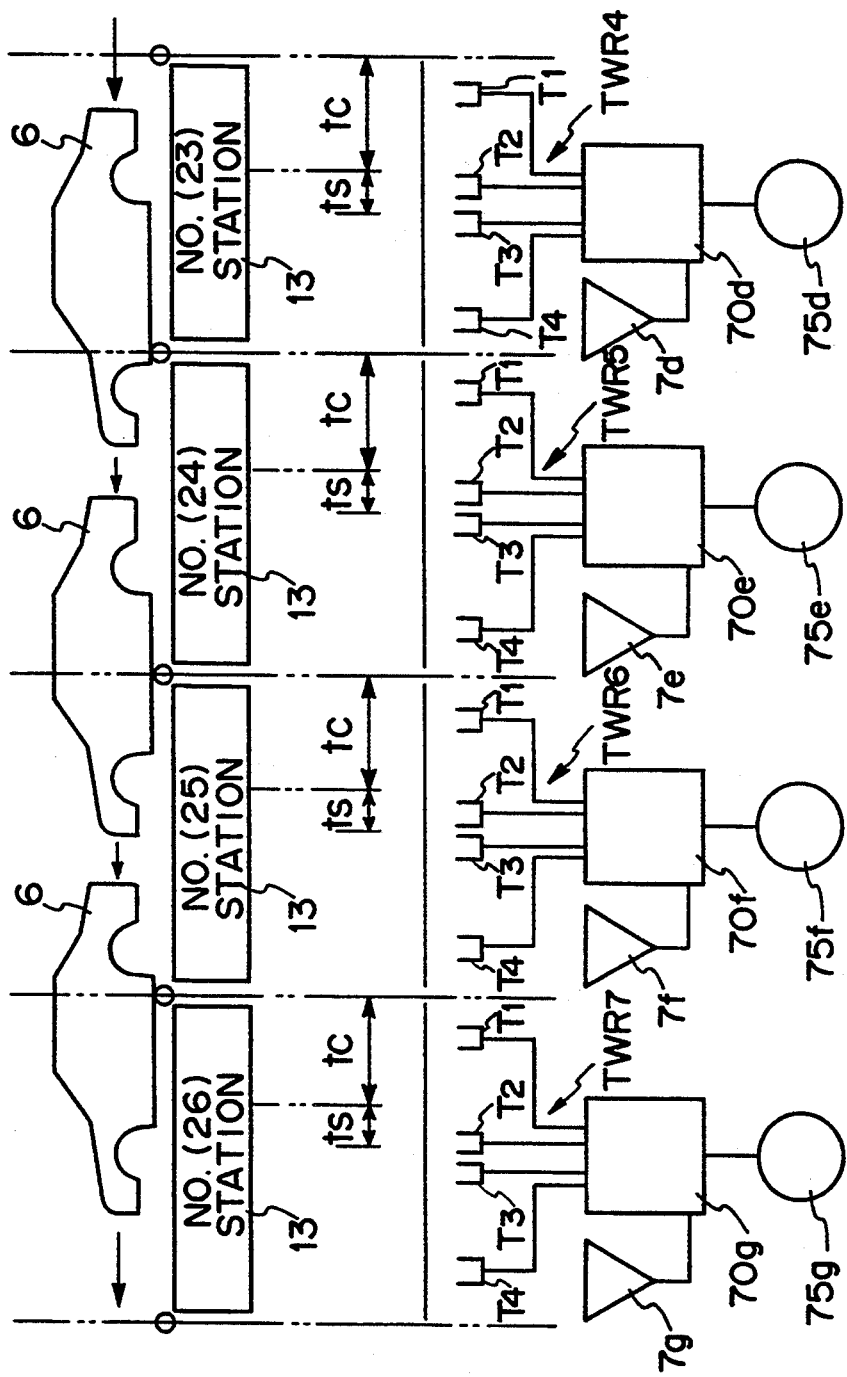
FIG. 6 is a block diagram showing the configuration of a group 1D of stations at which a correction operation on the lower portion is performed.

The lower-portion correction station group 1F has at least five unit assembling stations, #23 to #27, as shown in FIG. 6. Operations at the station group 1F are substantially the same as those at the upper-portion correction station group 1D. As shown in FIG. 6, CRT's 7d to 7g on which defect information on the lower portion of an automobile body is displayed and torque wrench units $TWR_4$ to $TWR_7$ for correcting defect points which are four-in-a-set are provided on each station of this group 1F. As in the station group 1D, limit switches $LS_9$ to $LS_{13}$ for detecting that the work pallets 13, 13 . . . which have been carried in to respective stations #23 to #27 are provided. Also, CRT switching delay time tc and torque-wrench-disabled-interval $t_s$ are set for the stations this station group 1F, where setting $t_s$ is exactly the same as in the upper-portion correction station group 1D.

Distributed Control System for Correcting Defects

All of the automobile body transporting apparatus 16, the work pallet transporting apparatus 17, the docking apparatus 40, the sliding apparatus 45, and the robots 48A and 48B of the assembly station group 1C are equipment devices for which predetermined sequential control is performed in conjunction with the body 6 or assembly parts 14 and 15.

The CRTs 7a to 7c of the group 1D of assembling stations for correction operations for the upper portion and the CRT 7d to 7f of the group 1F of assembling stations for the lower portion can be regarded as display control units for correction operation, including the peripheral attachment. As a result, each subsystem of the assembly station group 1C, and correction station groups 1D and 1F, can be represented by a system block diagram in the form shown in FIGS. 7 and 8. These subsystems shown in FIGS. 7 and 8 form an independent decentralized control system for correcting defects.

Figure 7:
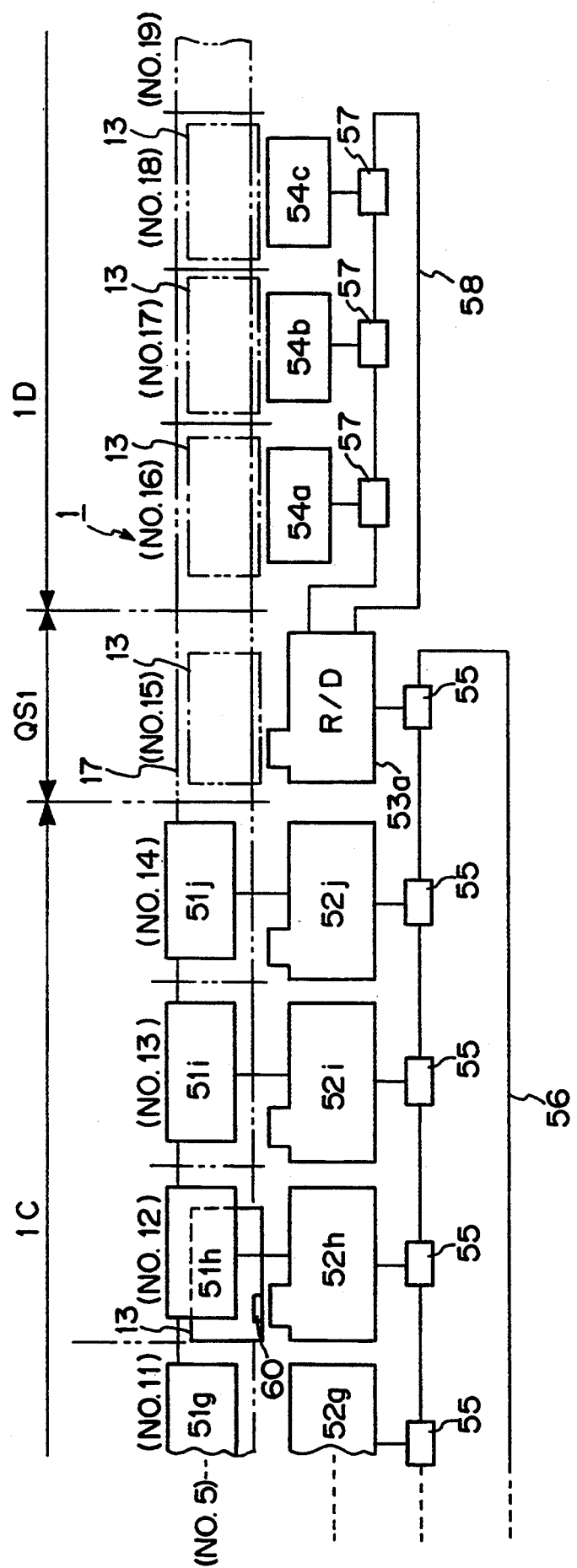
FIG. 7 is a block diagram showing the relationships between a group 1C of stations at which an assembly operation is performed and a group 1D of stations at which a correction operation on the lower portion is performed.

In the system for an correction operation on the lower portion shown in FIG. 7, defects detected during an assembly operation are written in the data carrier 60. This data carrier 60 is read by the R/D unit 53a at station #15. The R/D unit 53a prepares correction operation instructions which specify what kind of operations should be done at which station, then distributes the instructions to the stations. In each correction station, a correction operation control unit 54 controls to display the positions to be corrected according to the distributed instructions, as shown in FIG. 5. In FIG. 7, the correction operation control unit 54 (54a to 54c) includes the display controller 70a, a torque wrench T, the CRT display device 7, an encoder, and the like at each station in FIG. 4.

A correction for the upper portion of automobile body is performed in a manner similar to one described above, as shown in FIG. 8; defects on the upper portion thereof detected during assembly operation and recorded in the data carrier 60 are read by a reading/distribution (denoted as R/D in the figure) unit 53b of station #22. This distribution unit 53b prepares instructions such as what correction operation should be performed at which correction station, and then distributes the instructions to each station.

First, a combination of the assembly station group 1C and the correction station group 1F for the lower portion will be explained. As is clear from FIG. 1, in the present embodiment, there exists a plurality of sets (10 sets) of stations of #5 to #16 at which subdivided unit operations, for example, assembling the engine 14, assembling the rear suspension 15, or assembling a fuel tank are performed. Therefore, those can be regarded as equipment devices 51a to 51j sequential controls are subjected to. Control/recording units 52a to 52j (52a to 52f are not shown) that perform sequential control and record the operation results thereof in the data carrier 60 (which will be described later) are respectively disposed on the plurality of equipment devices for sequential control purposes 51a to 51j (in FIG. 7, 51a to 51f are not shown).

In the assembling station #15, which acts as an intermediary station between the assembly station group 1C and the correction station group 1D, the R/D unit 53a reads the information on the assembling results of the engine 14, the rear suspension 15, and the like assembled in the assembly station group 1C, and distributes the read defect data to correction operation control units 54a to 54c which are disposed in correspondence with the subsequent stations #16 to #18, depending on the work and the positions at which the defect has occurred on the work.

The control/recording units 52a to 52j that perform sequential control and record the operation results thereof, and the display control units 54a to 54c for a correction operation, are mutually connected to the defect data R/D (denoted as R/D in the figure) unit 53 via network interfaces 55, 55 . . . , and 57, 57 . . . , and data communication lines 56 and 58, respectively.

Transferring Defect Information Data

Figure 9:
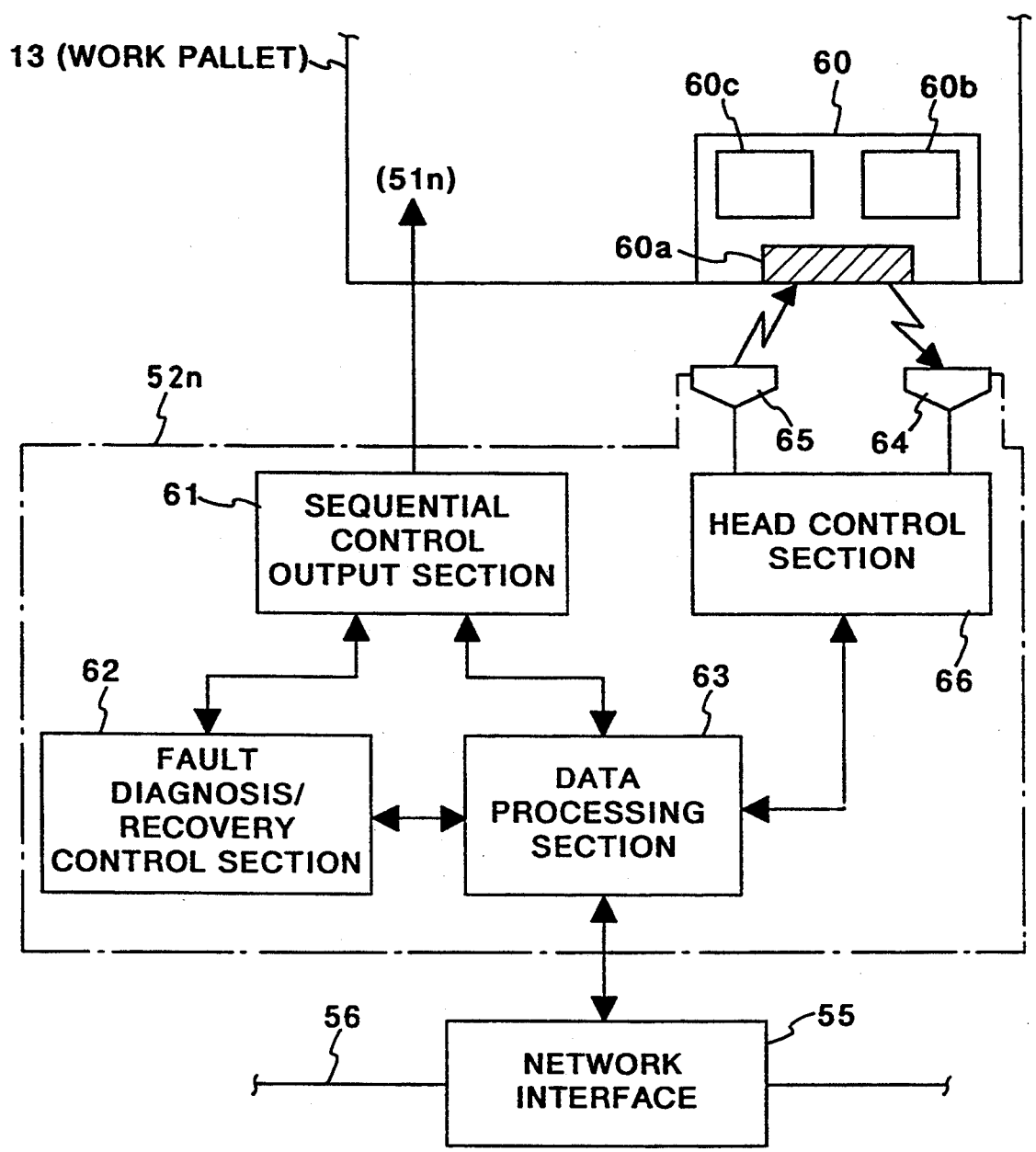
FIG. 9 is a block diagram showing the configuration of a station at which a correction operation on the upper portion is performed or a station at which a correction operation on the lower portion is performed.

The data carrier 60 is fixed to the side of the work pallet 13 which moves along the automobile production line and which transports the body 6, as shown in FIG. 9. Defect information is stored in this data carrier 60. Incorporated in the data carrier 60 are a memory 60b, a signal processing circuit 60c, and a transmission/reception coil 60a. Defect data supplied from outside through electromagnetic induction coupling between the coil 60a and external coils (one in a writing head 65 or a reading head 64 of a control/recording unit 52n) can be stored in the memory 60b, and the data stored in the memory 60b can read out to the outside (that is the R/D unit 53a).

The data carrier 60 is used to record and store every item of data on the pallet. Information on the work carried in the pallet 13 has already been written in the data carrier 60 before the work is carried into station #31 of the production line in FIG. 1. The memory 60b in the data carrier 60 has a memory capacity of a total of 6 to 8 KB, and the data structure thereof is, for example, as shown in FIG. 11. More specifically, the memory 60b has two fields: a storage area PD in which production information data is stored and storage areas $SD_1$, $SD_2$, $SD_3$ . . . $SD_n$ in which data on the operation results of an assembly operation at each assembling station is individually stored. For example, speaking of storage area $SD_m$, each of the storage areas $SD_1$, $SD_2$, $SD_3$ . . . $SD_n$ is separated into a field $CC_m$ in which operation data is stored, a field $CP_m$ in which data specifying a work in which a defect has occurred and the position of the defect are stored, and a field $CD_m$ in which other various information (for example, messages about defects) is stored. As explained with reference to FIG. 5, the display controller 70a presents a display shown in FIG. 5 on a CRT.

In the present embodiment, a microwave technique utilizing electromagnetic induction are used to transfer the defect data, because microwaves have substantial resistivity to electromagnetic induction noise and capability of communicating between the data carrier 60 on the pallet side and the writing head 65 of the control/recording unit 52. Microwaves are suited to transfer data over a long distance. In a factory having assembly lines where little contamination occurs, a laser beam mechanism is used for communication rather than microwaves.

Figure 8:
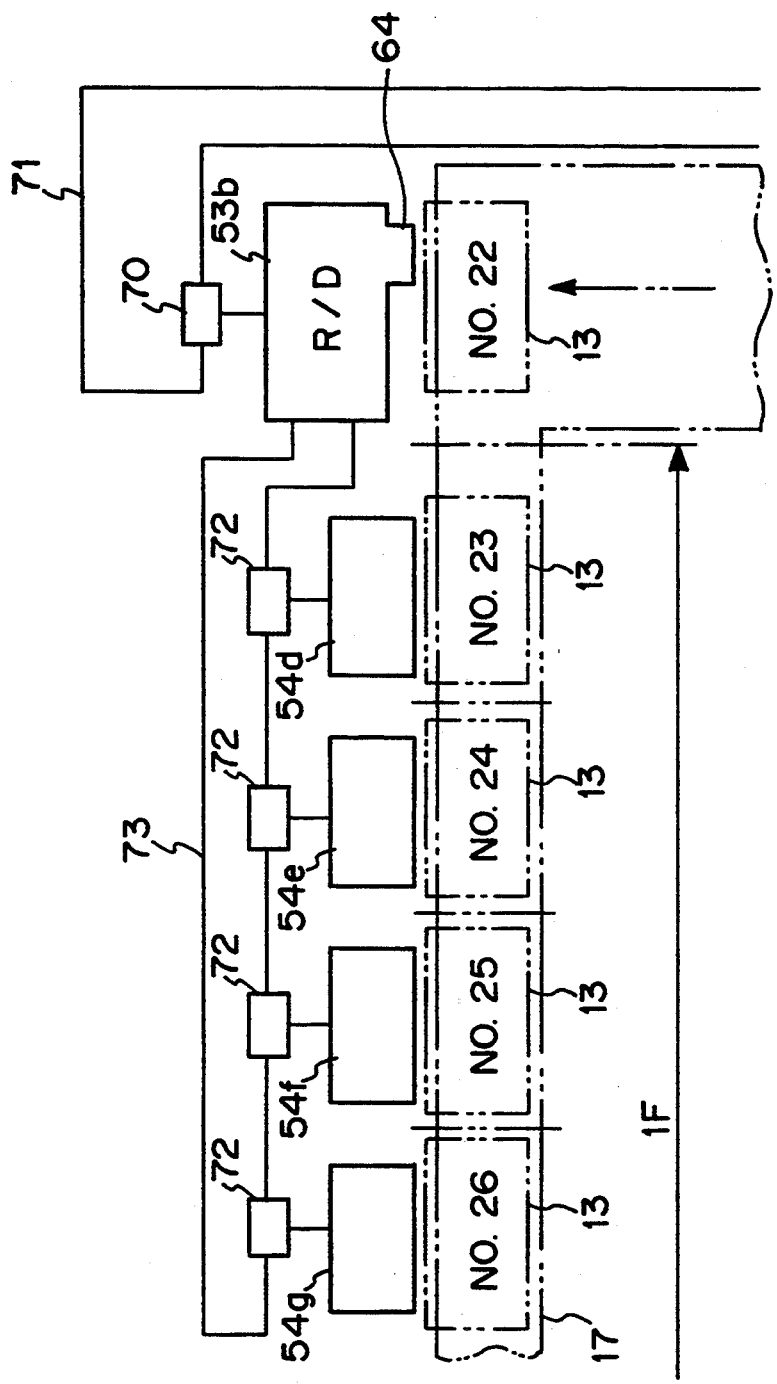
FIG. 8 is a block diagram showing the relationships between a group 1F of stations at which a correction operation on the upper portion is performed.

The stations are coupled by a communication line as shown in FIGS. 7 and 8. The reason why data is transferred by using the data carrier 60 but not using the line is that, since the data carrier 60 stores data which is native to each pallet, as to which station a specific pallet has arrived at, reading/writing the data carrier 60 is more reliable than using the communication line.

As shown in FIG. 9, each of control/recording units 52a to 52j (represented by $52_n$ in FIG. 9) further includes a sequential control output section 61 and a fault diagnosis/recovery control section 62. The sequential control output section 61 supplies sequential control signals to the equipment devices $51_n$ (51a to 51j are represented by 51n). The fault diagnosis/recovery control section 62 detects a failure and locates the position of the failure when a failure occurs at the device $51_n$, and performs a function for recovering the device to a normal state. For example, in a case where a control objective of the sequential control output section 61 at a certain assembly station is a nut runner, an overload condition is detected on it. A data processing section 63 controls the sequential control output section 61 and the fault diagnosis/recovery control section 62 to process data sent and received via a network interface 55.

In addition, connected to the data processing section 63 via a writing/reading head control section 66 are two heads: a reading head 64 in which a coil used to read data stored in the data carrier 60 which is fixed to the work pallet 13; and a writing head 65 in which a coil is used to write data in the data carrier 60. The writing/reading head control section 66 sets the writing head section 65 to a writing operation mode to write data sent from the data processing section 63, or sets the section 64 to a reading operation mode to supply data stored in the data carrier 60 to the auxiliary assembling station group 1E, as required.

R/D Unit 53

Figure 10:
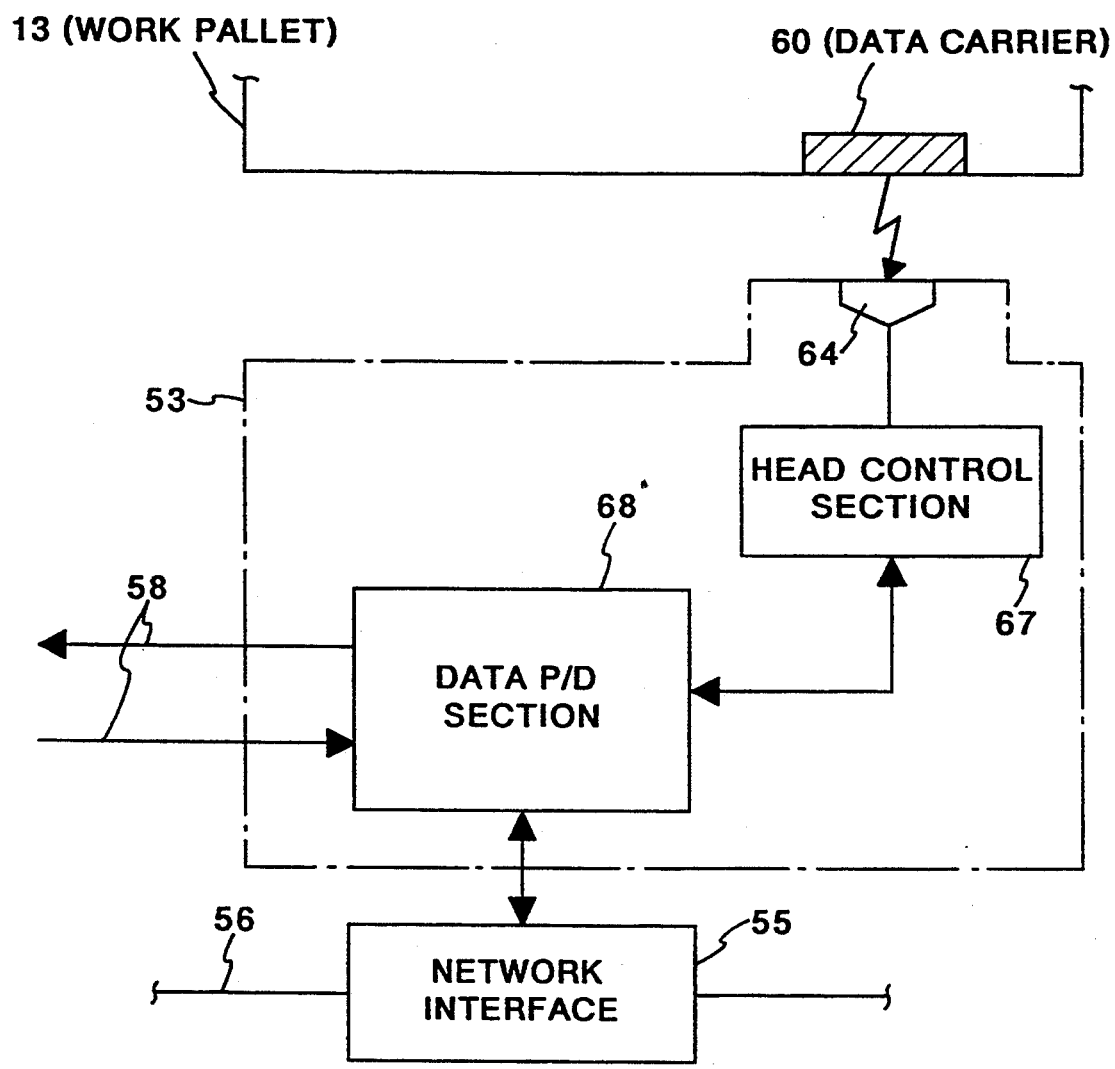
FIG. 10 is a block diagram showing the configuration of a reading/distribution unit 53 which reads data indicating the contents of a defect, on the basis of which data correction operation instruction data is prepared.

FIG. 10 shows the configuration of the defect data R/D unit 53.

In the unit 53, as shown in FIG. 10, the reading head 64 for reading data stored in the data carrier 60 is connected to a data processing/distribution unit 68 (denoted as P/D in FIG. 10) via a reading head control section 67. The data P/D unit 68 is further connected to the network interface 55 and is connected to the control/recording units 52 of the assembly stations via the network interface 55. In addition, as shown in FIG. 7, the data P/D unit 68 is connected to the display controller 70 of the respective correction operation control unit 54 of each correction station via the network line 58. The reading head control section 67 causes the reading head 64 in read mode to read out defect position data CP and defect data CD stored in the data carrier 60 to the data P/D unit 68. The data P/D unit 68 prepares correction instruction data depending on these data CP and CD and sends it onto the signal line 58.

Correction Operation Control Unit 54

Figure 12:
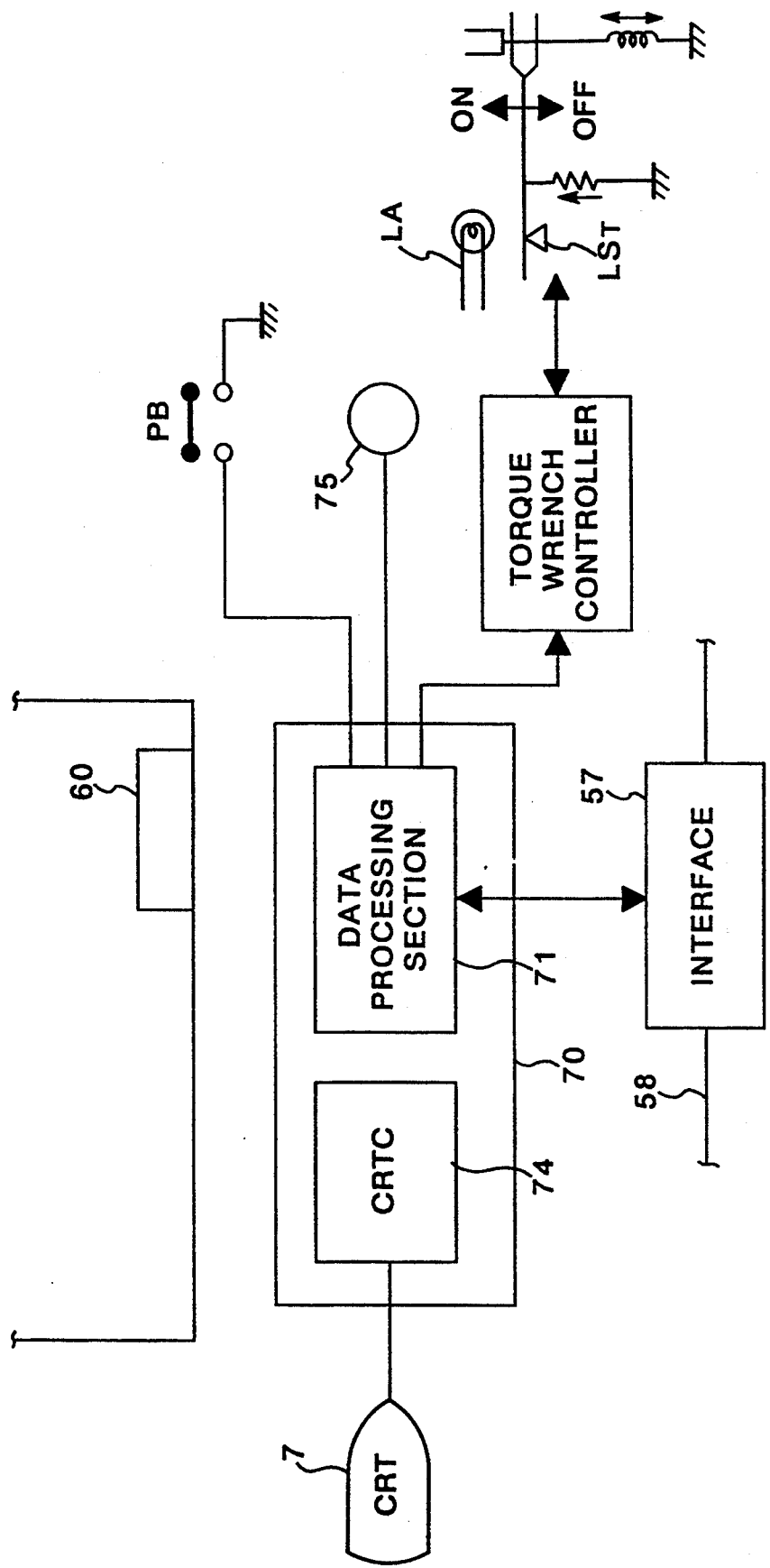
FIG. 12 is a block diagram showing the configuration of a correction station.

FIG. 12 shows the overall configuration of the correction operation control unit 54 of a station in which a correction operation is performed.

The correction operation control unit 54 at each of the correction stations (#16 to #19, and #23 to #27) comprises the CRT 7, the display controller 70, the encoder 75, a plurality of torque wrenches TWR, a lamp LA for informing an operator which torque wrench should be used, a hook switch LS for detecting whether or not a torque wrench is used by the operator, a torque wrench controller 73 for controlling the torque wrench and detecting the load thereof, and a network interface 57. The display controller 70 comprises a CRTC 74 for controlling the display of the CRT display device 7 and a data processing section 71. The data processing section 71 sends and receives data to and from the data communication line 58 via the network interface 57, accepts correction operation instructions, and further creates a display screen shown in FIG. 5 regarding the instructions and sends it to the CRTC 74.

The data processing section 71, as mentioned above, is connected not only to the torque wrench controller 73, the encoder 75, the limit switch LS, and the lamp LA, but to a manual pushbutton switch PB which is pressed by an operator. Thus, the data processing section 71 is able to recognize the position of the pallet 13 which enters the correction station by means of the encoder 75, to judge, by means of the limit switch LS, if the operator actually is using a torque wrench, and to automatically judge, by means of the output of the torque wrench controller 73 if the torque wrench has finished to re-fasten bolts. The completion of correction operation using a torque wrench can be automated in this manner. However, in some operations, automatic detection is impossible. As regards such correction operations, the operator can notify the completion of an operation to the data processing section 71 by pressing the button PB.

Symbols designated ①to ⑦in FIG. 5 indicates the sequence of displayed operations. More specifically, the operator recognizes these sequence numbers from the display screen and performs the correction operation in that order. This order has been sent to the data processing section 71 from the distribution unit 53 via the communication line 58. The data processing section 71 waits for a re-fastening completion signal from the torque wrench controller 73 or the depression signal of the button PB, according to the order of ①to ⑦. When, for example the PB button is pressed while the data processing section 71 is waiting for a correction operation of the order ②, the data processing section 71 determines that the operation of ②has been terminated. In a case where a correction operation is re-fastening and if a re-fastening completion signal is sent from the torque wrench controller 73 while the data processing section 71 waits for the completion of correction operation ③, the data processing section 71 determines that the operation ③has been completed.

Flow and Operation of the Entire System

Next, how this system operates will be explained.

During the final assembly of an automobile, first, the body 6 and the work pallet 13, on which various parts to be assembled on the body 6 are mounted, are moved along the automobile assembly line 1 and are carried sequentially to each assembling station in the assembly station group 1C. The control/recording units 52a to 52j control equipment devices 51a to 51j for sequential control purposes, respectively. In this case, at each of the control/recording units 52a to 52j, the data processing section 63 controls the writing/reading head control section 66, as required, to read production information data stored in the data area PD corresponding to the assembling station, which data is written in the data carrier 60. The data processing section 63 supplies control data based on the read production information data to the sequential control section 61. This section 61 controls the equipment devices 51a to 51j to take one or more action corresponding to the control data from the data processing section 63.

The data processing section 63 obtains data indicating the result of the assembly operation from the data control section 61, and sends it to the fault diagnosis/recovery control section 62 where it is determined whether defects have occurred. The head control section 66 operates to write defect occurrence data into the data carrier 60 via the writing head 65, depending on the result of the determination of the fault diagnosis/recovery control section 62. This data is written in the field of $SD_1$ to $SD_m$ corresponding to the assembly operation. That is, when the result of the operation is appropriate, it is written in a storage area CC (see FIG. 11) as operation data. In contrast, when the result of the operation is not appropriate, data on the work in which a defect has occurred and the position of the work at which the defect has occurred are written in the storage area CP. A defect message about the defect occurring at that time is written in the storage area CD.

In this way, writing of data into the defect information data carrier 60 is performed according to the order of the stations at the assembling station group 1C.

The work pallet 13 (including the body 6 and various parts assembled in the body 6), for which assembly operations at assembling stations #5 to #14 of the assembling station group 1C have been finished, is moved to a data reading station $QS_1$. This work pallet 13 is first positioned in the data reading station $QS_1$ (station #15) as shown by a long and two short dashes line in FIG. 7. Thereafter, the data P/D unit 68 (FIG. 10) of the defect data R/D unit 53a placed in the data reading station $QS_1$ reads data of the storage areas $SD_1$ to $SD_m$ corresponding to each assembling station. As a result, the distribution unit 68 is able to recognize which work has a defect, the position of this work and at which assembly station this defect has occurred.

The data P/D unit 68, on the basis of defect work data, defect points, defect substance data, etc. of an automobile mounted on the pallet 13, which are read from the data carrier 60, determines a correction operation to be performed to eliminate these defects, assigns operations to correction stations #16, #17, and #18, and sends out correction operation distribution data of each assembling station to the data communication line 58.

Figure 13:
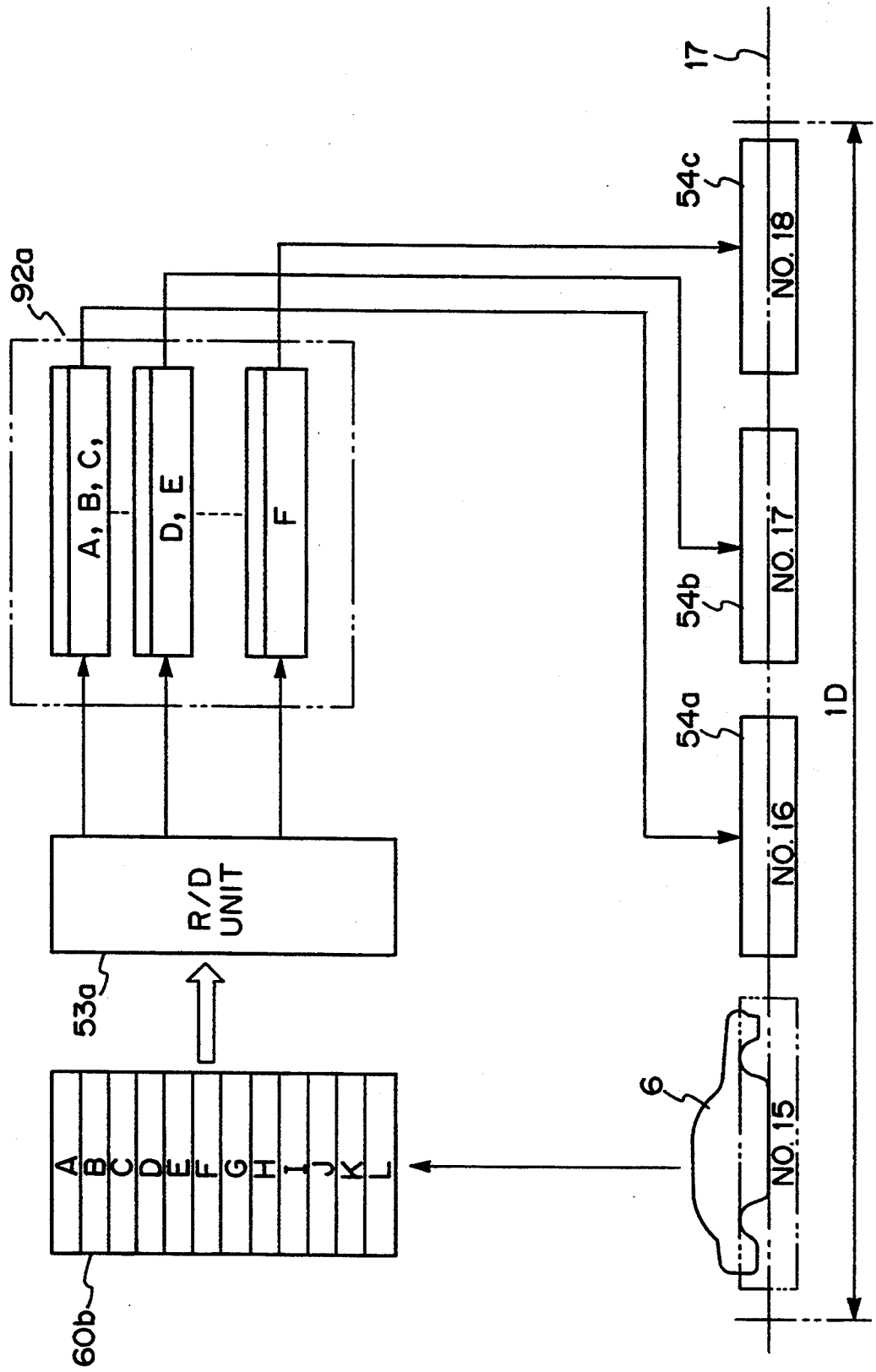
FIGS. 13 and 14 are each a view showing the method of distributing correction operation instruction data by means of the R/D unit 53.
Figure 14:
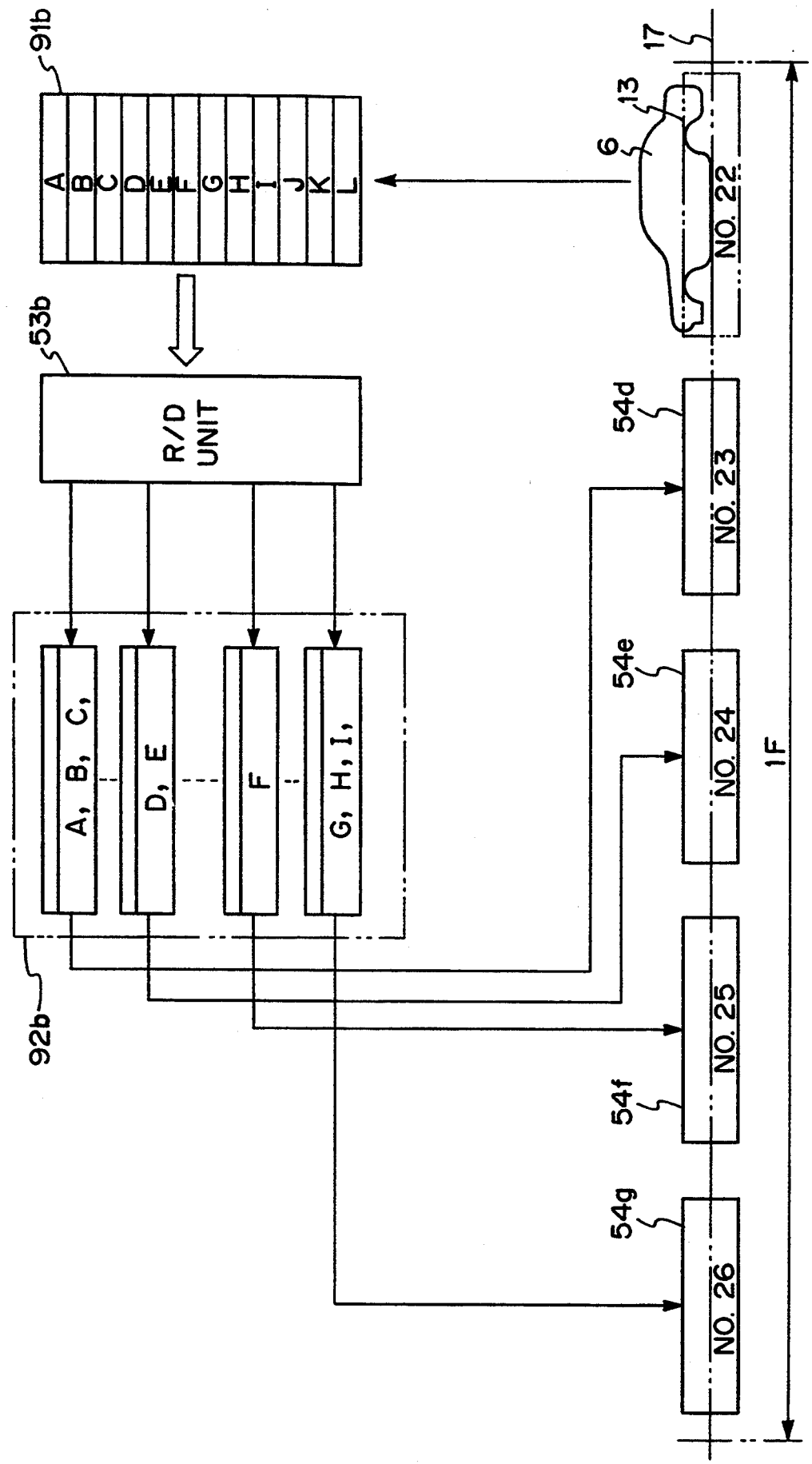

In FIG. 13, suppose that, for the body 6 at station #15, the R/D unit 53 reads twelve defect data of A to L from the data carrier 60. In the example of FIG. 13, the R/D unit 53 assigns the defects to the stations that will correct them in such a manner that the defects A, B, and C will be corrected at station #16, defects D and E corrected at station #17, and defect F corrected at station #18. Such assignment information is input to correction operation control units 54a to 54c respectively corresponding to the correction stations #16, #17, and #18 via the network interface. The information is concretely displayed on defect data display CRTs 7a to 7c.

Assignment Distribution Method

A method of distributing and assigning correction operations of the R/D unit 53a will now be explained with reference to FIGS. 15 and 16.

As explained in conjunction with FIG. 1, a wide variety of assembly operations are performed at the assembling station group. Accordingly, the contents of correction operations corresponding to the assembly operations and the tools used therein are widely diversified. Therefore, the correction operations should be performed at a plurality of correction stations.

Correction operations in the present system are distributed based on the following five considerations.

① : A correction operation is classified into an upper-portion correction operation or a lower-portion correction operation depending on the contents of the operation. These operations are separately performed at station groups 1D and 1F, respectively, because such a separation enables the automobile to be efficiently assembled.

② : After the correction operation is broadly classified into the above two categories, the correction operation is further classified according to tools to be used.

③ : It is generally possible for a certain correction station to be specialized to perform a specific correction. However, such specialization causes the number of correction stations to increase. It is also possible that a certain correction operation may occur more often than another certain correction operation. Therefore, the number and the configuration (an assignemnt concerning what correction operation is possible at which station) of correction stations should be determined by predicting and taking into consideration the kind, frequency, etc. of correction operations which will be required.

④ : In an assembly line on which engines are assembled to automobile bodies 6, as in the example shown in FIG. 1, it is enough that the kinds of correction operations which arise at the assembling station group 1C be classified into two operations concerning a lower and upper portions, correction operations for the upper portion can be performed with three kinds of torque wrenches and correction operations for the lower portion can be performed with four kinds of torque wrenches. From the above points, all stations #16 to #19 have three kinds of torque wrenches ($T_1$, $T_2$, and $T_3$ in FIG. 4), and all stations #23 to #27 have four kinds of torque wrenches ($T_1$, $T_2$, $T_3$, and $T_4$ in FIG. 6). In other words, all stations #16 to #19 can equally perform correction operations for the upper portion, and all stations #23 to #27 can equally perform correction operations for the lower portion.

Hence, for example, in a case where correction operations for the upper portion, in which torque wrench $T_2$ is used, should be performed at twelve positions, it is possible that the distribution unit 53a distributes them so that the correction operations using the torque wrench $T_1$ are evenly performed at correction stations, namely three operations are performed at each of the stations of #16 to #19. Since station #19 is the final station at which upper-portion correction operations are performed, it is desirable that the amount of operations to be assigned to station #19 be small from the viewpoint that all correction operations should be finished by this station.

⑤ : Correction operations may also be assigned to correction stations from the following viewpoint. That is, correction operations are assigned to stations so that an operator at each correction station may move as little as possible. In this case, when a torque wrench should be replaced, the distance an operator moves to replace the torque wrench should be taken into consideration. When it is possible to use the same torque wrench, a plurality of correction operations which are near to each other should be assigned to one correction station.

Figure 15:
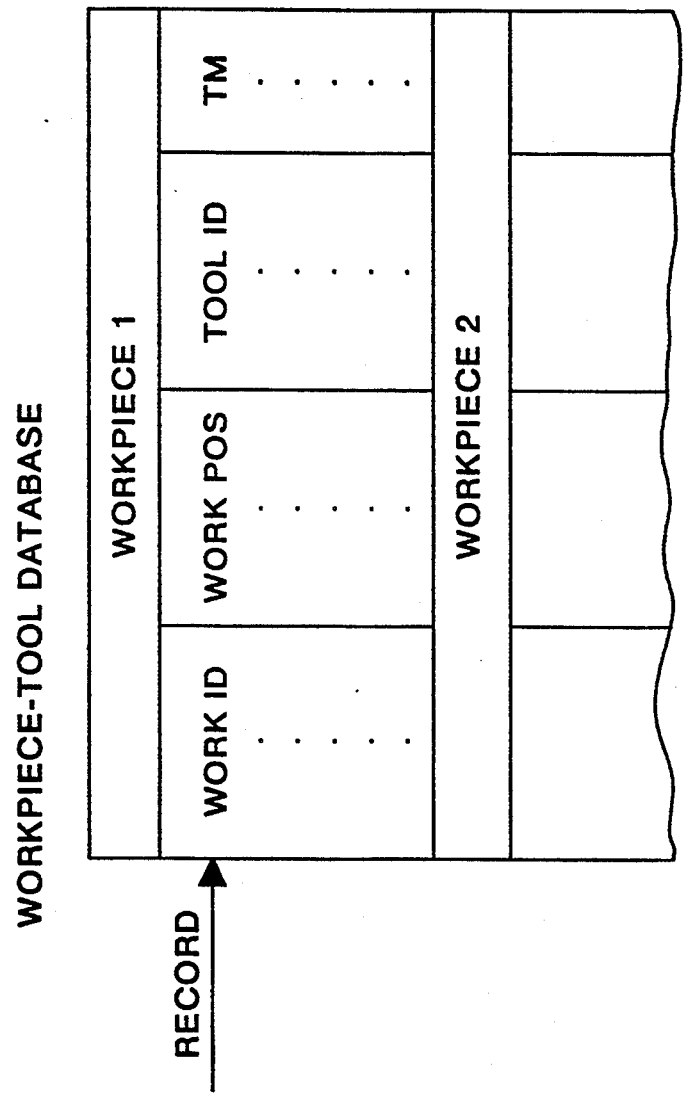
FIGS. 15 and 16 are each a view showing the structure of a database stored in the R/D unit 53.
Figure 16:
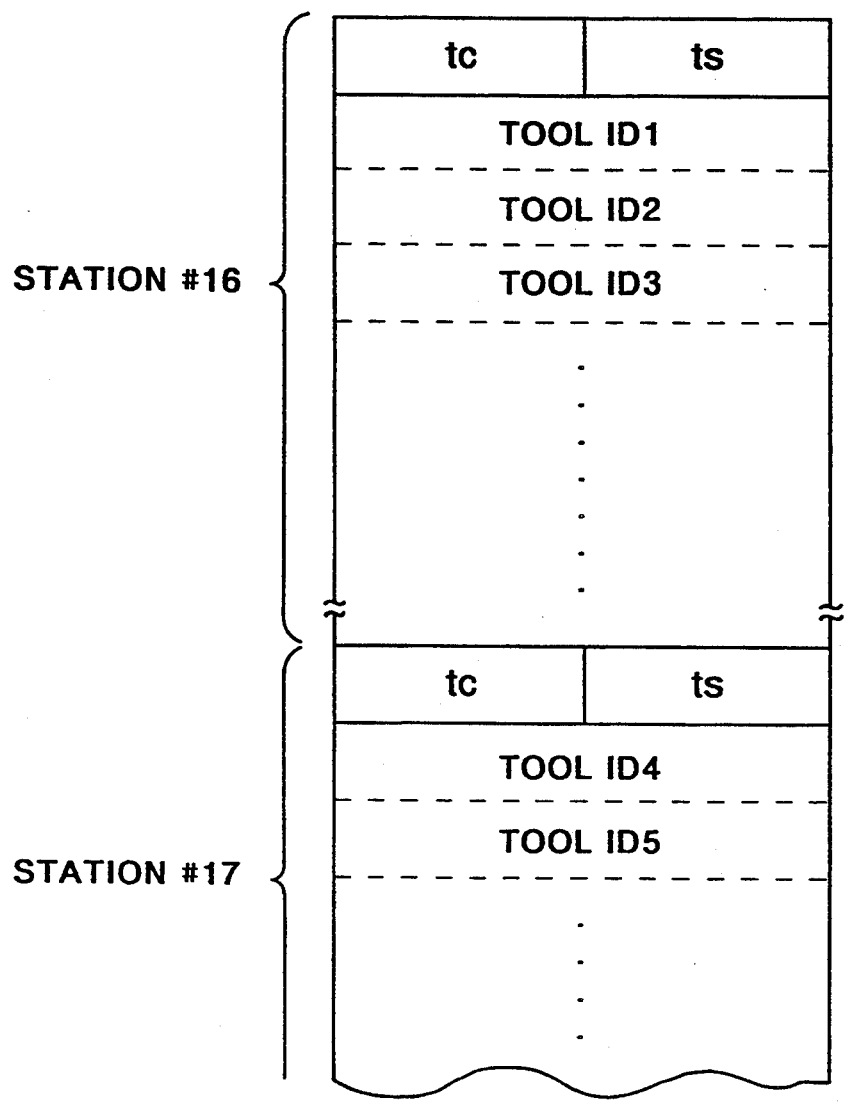

Since the distribution unit 53a can assign such correction operations to correction stations, it has a database shown in FIGS. 15 and 16.

FIG. 15 shows a database in which records are set for each work. Each record in this database consists of an identifier (WORKID) of a position (i.e., defect occurrence position) at which an assembly operation has been performed at the assembling station group 1C, position data (WORKPOS), an identifier (TOOLID) of a correction tool required for correction operation, and a time (TM) required to perform the correction operation. In other words, one record in FIG. 15 corresponds to one correction operation.

FIG. 16 shows a database set for each correction station. The data base describes tools which can be used in that station. Each record of this database consists of a display switching delay time ($t_c$), a time period ($t_s$) during which the detection of the completion of a correction operation is disabled, and an identifier (TOOLID) of the tool used for the correction operation.

The above delay time periods $t_c$ and $t_s$ will be described later.

Figure 17:
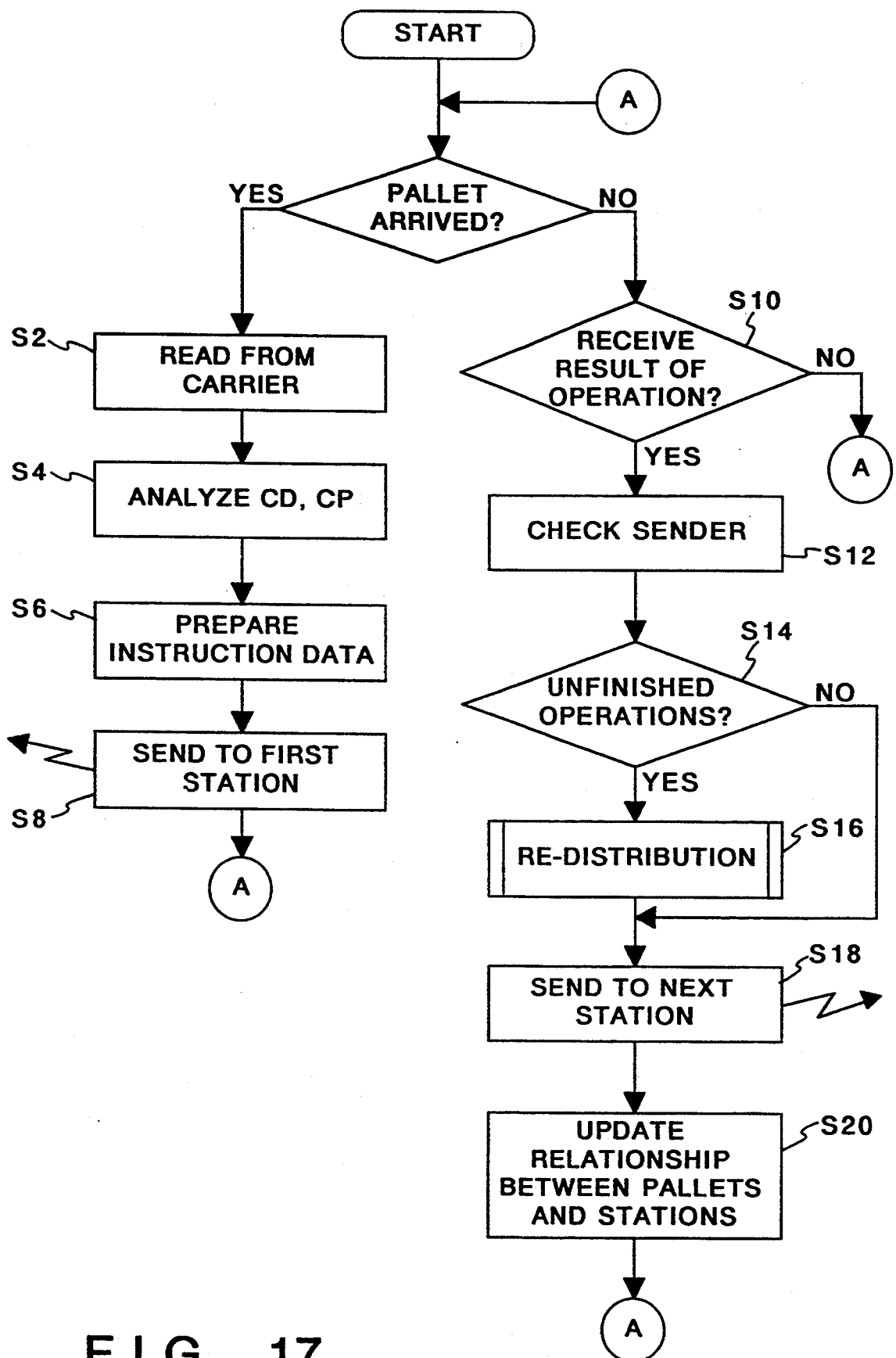
FIG. 17 is a flowchart showing a sequence of executions in the R/D unit 53.

FIG. 17 is a flowchart of an algorithm of a distribution by the distribution unit 53a. When the arrival of a pallet is detected (this detection is performed by a limit switch $LS_2$ in FIG. 4) in step S2, the R/D unit 53a reads the contents of CC, CP, and CD (FIG. 11) of the data carrier 60. In step S6, the CC and CP data are analyzed. In step S8, correction operations are distributed to the respective correction station on the basis of the result of this analysis.

Data processing in steps S6 and S8 will now be explained in more detail. First, a work-tool database (FIG. 15) is searched by using the defect occurrence position data of the CC and CP data as a key for one correction operation record having a work identifier WORKID and a work position WORKPOS that matches with the position data. All of a plurality of correction operation records each comprising the combination of the WORKID, WORKPOS, the tool identifier TOOLID, and the operation time period TM retrieved in the manner described above, are sorted using the TOOLID as a key. A set of the records obtained in this manner becomes a set of data sorted according to tools required for the correction operations. Next, the set of sorted correction operation records are further sorted so that one operator can continuously perform the correction operations by using the same tools and has to move as little as possible. In this case, the distance the operator moves is computed by referring to the WORKPOS data and is optimized so that the distance the operator has to move is minimum.

Suppose that a set (RCD1, RCD2, RCD3, and RCD4) of the correction operation records are obtained for a certain tool having an identifier of TOOLID1, as shown in FIG. 18. In the example of FIG. 18, the working times for four correction operations (RCD1, RCD2, RCD3, and RCD4) are TM1, TM2, TM3, and TM4, respectively. If the total working time TM1+TM2+TM3+TM4 is greater than a time required for the pallet to pass the correction station, and if the total working time TM1+TM2+TM3 is not greater than the time required for the pallet to pass the correction station, then correction operations corresponding to RCD1, RCD2, and RCD3, are assigned to the correction station. Before correction operations are actually assigned to the correction stations, the station database of FIG. 6 is searched by using the TOOLID as a key so that the objective correction station has the required tool.

A sequence of the correction operations is determined so that the distance an operator moves becomes minimum. To compute this optimization, defect occurrence position data WORKPOS is used.

Figure 19:
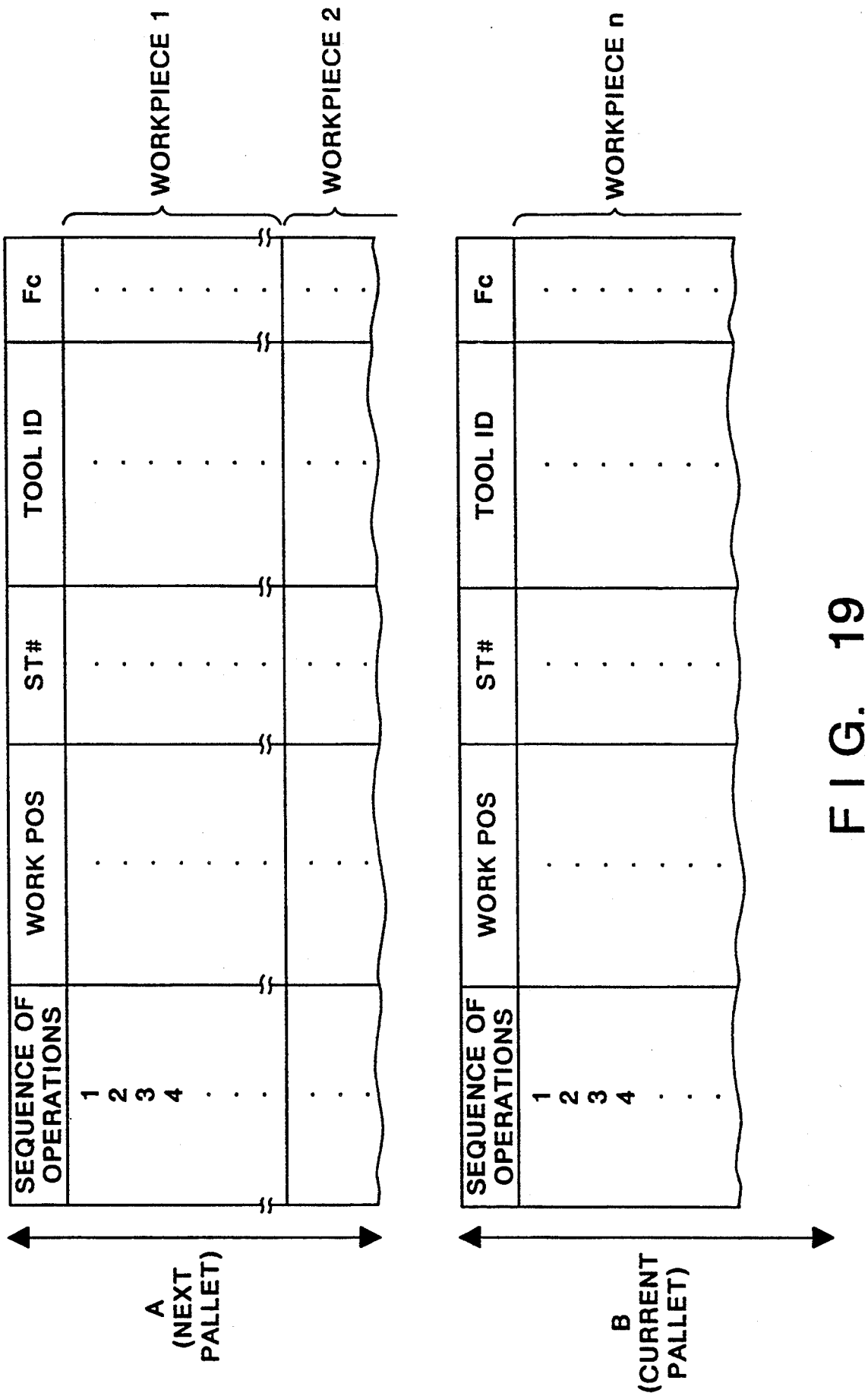
FIG. 19 is a view showing the structure of correction operation instruction data.

Correction operation instruction data, distributed to each correction station, has format A shown in FIG. 19. In FIG. 19, correction operation instruction data is classified for works on which defects have occurred. A record of the instructions for each work consists of positions (WORKPOS) at which defects have occurred, a station number (ST#) in charge of the correction of the defects, an identifier (TOOLID) of tools to be used for the correction, and a flag ($F_c$) indicating whether or not the correction operation has been completed.

The reading/distribution (R/D) unit 53a supplies the correction operation instructions prepared in the manner describe above to the correction stations over the data communication line 58, as shown in FIG. 13.

Operations for a Correction Operation

As shown in FIG. 12, each correction station has a display controller 70 connected to the data communication line 58 via the interface 57, a CRT display device 7, etc. The controller 70 displays correction operations to be performed at this correction station on the CRT display device 7. More specifically, the contents and objectives of the correction operations regarding the body 6 and various components are shown as in FIG. 5.

With reference to FIG. 5, a specific example of a display manner of correction operation instructions will now be explained. At least four kinds of information described below are displayed on the CRT 7, each of which is specifically displayed:

i. Commitment number and type of automobile attached to the pallet,
ii. Graphic display of the work in which a defect has occurred, and positions at which the defects have occurred,
iii. Sequence of correction operations, and
iv. A message for further information on the defects. The display manner of the information above are, for example, as follows:
(a) In a case where there exist defects, the positions thereof are indicated by red circles,
(b) In a case where there exist defects and the defects are to be corrected in the present station, the positions thereof are indicated by double red-circles,
(c) In a case where there exist defects but they have already been corrected, the positions thereof are indicated by black circles, and
(d) In a case where no defects exist, no display.

At each correction station, for example, at each of correction stations #16 to #18 shown in FIG. 4, torque wrenches $TWR_1$ to $TWR_3$, each of which has three torque wrenches $T_1$ to $T_3$ as a set, are provided. Each of the torque wrenches $TWR_1$ to $TWR_3$ are electromechanically connected to the display controller 70, as shown in FIG. 12.

The torque wrenches $T_1$ to $T_3$ are engaged via predetermined hook switches $LT_{T1}$ to $LT_{T3}$, respectively. Display lamps $LA_1$ to $LA_3$ are provided on the torque wrenches $T_1$ to $T_3$, respectively. By turning on or off the display lamps, a torque wrench to be used as a tool is specified. When the operator correctly picks up the corresponding torque wrenches $T_1$ to $T_3$ in accordance with the display of the display lamps $LA_1$ to $LA_3$, hook switches $LT_{T1}$ to $LT_{T3}$ are turned off. Consequently, the controller 70 can confirm that specified torque wrenches $T_1$ to $T_3$ are correctly used. When correction operations using the specified torque wrenches are completed and the wrenches are returned, hook switches $LT_{T1}$ to $LT_{T3}$ are turned on, consequently, the controller 70 can confirm that the correction operation has been completed. All these states are displayed on the display CRTs 7a to 7c.

As described above, the completion of a correction operation using a torque wrench is also automatically determined by the controller 73 detecting an increase in the load of the torque wrench used, and the controller 73 notifies the completion to the controller 70. For a correction operation which is difficult to automatically detect such completion, as mentioned earlier, the completion is notified to the controller 70 by an operator pressing a button PB.

The correction operation instruction data explained with reference to FIG. 19 is correction operation instructions on an automobile placed on a certain pallet 13. In this instruction data, the ST# field shown in FIG. 19 specifies the assembling station at which each correction operation is to be performed.

In an actual operation, however, where there exists ten (10) correction operations at a certain station, a case may occur in which an operator at that station could only perform eight (8) correction operations. In such a case, instruction data in FIG. 19 must be formatted or constructed again. Hence, in the present system, when the pallet moves to a predetermined position within a correction station, the station sends back the instruction data (attached with a completion flag $F_c$) of FIG. 19 to the R/D unit 53 as operation result data. When the R/D unit 53 receives this data, it reconstructs the instructions, if necessary, and redistributes the reconstructed correction instructions. Steps S1 to S18 in FIG. 17 are the sequence of the redistribution.

If a new pallet has not arrived at a predetermined position, the R/D unit 53 waits, in step S10, for the arrival of the correction operation result data from the correction station. When the R/D unit 53 receives the resulting data, it checks a sender of the data in step S12. This confirmation is made by checking the commit number assigned to the pallet with the station number which has sent back the result data. More specifically, if, for example, pallets of 13a, 13b, 13c, and 13d (not shown) exist in each of the stations #16, #17, #18, and #19, there is no possibility that station #17 will send back the result data of pallet 13a. After this checking procedure, the control proceeds to step S14 where it is checked, on the basis of the data, whether or not any unfinished correction operations exist at the station which has sent back the correction operation result data. If any unfinished correction operations exist, the unfinished operations are redistributed in step S16. This redistribution operation can be performed by the same method as that explained in steps S4 and S6. That is, tools which were required in unfinished correction operations are determined; stations having these tools are determined; and it is checked whether it is possible to add new correction operations to the stations by redistribution. When new correction operation instructions are prepared, they are sent to a subsequent station.

In this way, the correction operation instruction data circles around, as shown below, within a group of upper-portion correction station groups:

Distribution unit 53a→Station #16→Distribution unit 53a→Station #17→Distribution unit 53a→Station #18→Distribution unit 53a→Station #19.

Prevention of Errors in Correction Operations

Figure 20:
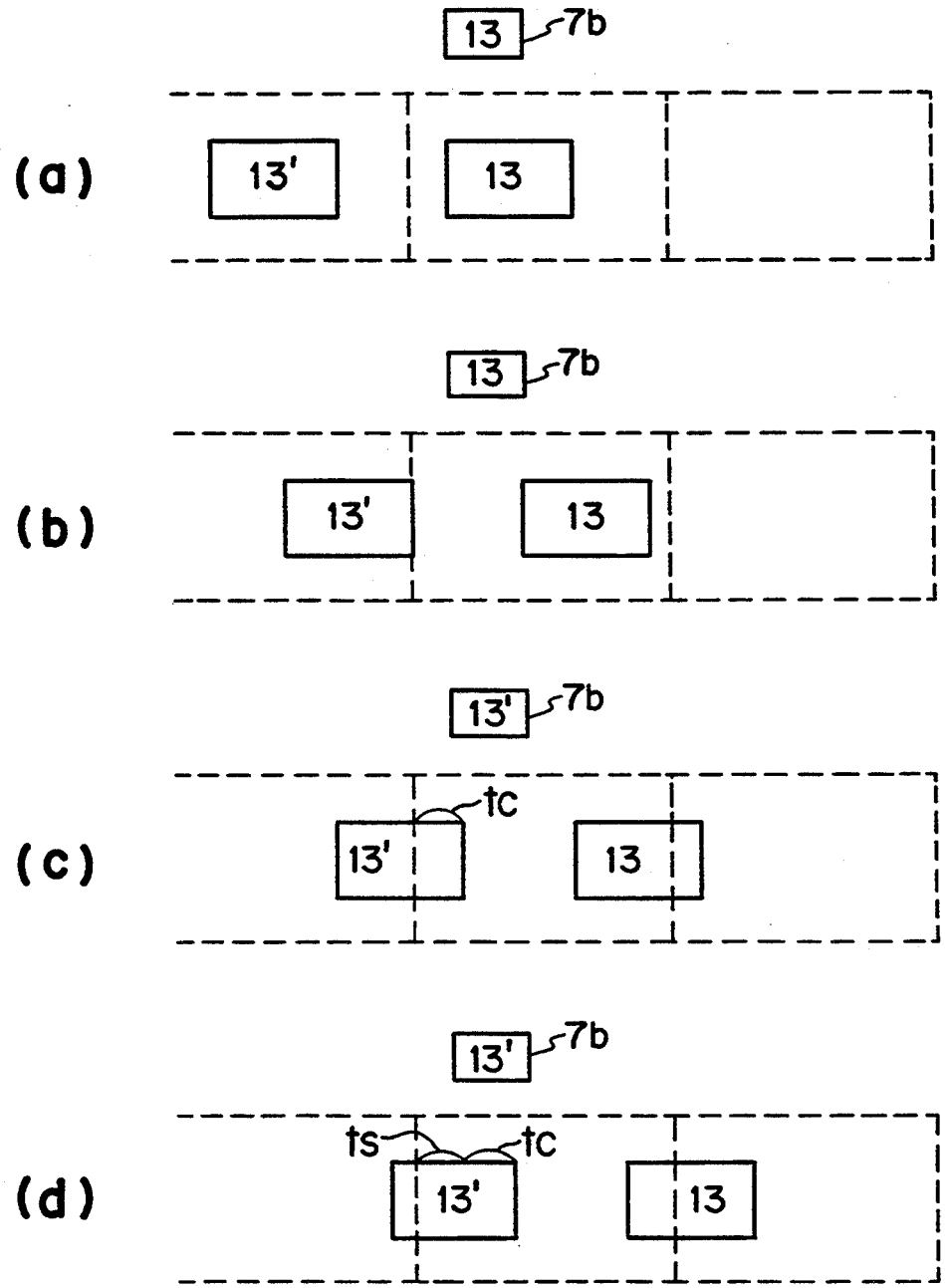
FIG. 20 is a view showing a situation in which a so-called "go-after another" occurs.

As mentioned earlier, a screen (with a correction operation indicator) is forcibly switched on CRT display 7 at each correction station. This is because it is possible that an operator may enter the area of another operator (a so-called "go-after another"), which must be prevented. FIG. 20 shows why an erroneous recognition of correction operation positions occurs due to this automatic switching of the screen.

FIG. 20 shows that pallets 13 and 13' are in stations #16 and #17, respectively, and the way in which these pallets move along the line. FIG. 20 (a) shows a situation in which the pallet 13' is in station #16. Correction instructions for the pallet 13 should be displayed in the CRT display device 7b of station #17. Thereafter, the line advances and the pallet 13' reaches station #17 in FIG. 20(b). However, in the present system, switching over the screens of the CRT 7b is not performed even at this time. The reason for this is that an operator at station #17 is supposed to perform a correct ion operation somewhere on the pallet 13 at that time. If the screen is changed immediately, there is a great possibility that the operator at station #17 will misunderstand correction operation instructions for the pallet 13' to be instructions for the pallet 13. In the present system, also, since the display controller 70 automatically detects the completions of correction operations, the results of correction operations performed by an operator on an automobile on the pallet 13 would be erroneously stored as the results of the operations for an automobile on the pallet 13'. This is another reason why switching over the screen display is delayed.

Therefore, in the present system, in the situation shown in FIG. 20(c), when a time period $t_c$ has elapsed after the pallet 13' reaches station #17, the screen is changed from a screen for the pallet 13 to one for the pallet 13'. This change is because if the pallet 13' moves to this stage, the operator fully recognizes it. Therefore, at this time, correction operation instructions for the pallet 13' are displayed on the CRT 7b.

FIG. 20(d) shows a situation in which the pallet 13' has moved to a point of $t_c+t_s$ after a lapse of the time period $t_s$. In the present system, it is not disabled to detect the depressing of the button PB explained with reference to FIG. 12 or to detect the completion signal of a torque wrench operation by means of a torque wrench controller 73 during the time period $t_s$ from the time shown in FIG. 20(c) to that in FIG. 20(d). The reason for this is because if an operator continues an operation without noticing the arrival of a new pallet 13' during the time shown in FIG. 20(c) to FIG. 20 (d), the completions of the operations for the pallet 13 would be erroneously stored as one for the pallet 13'. Disabling the completion signal serves to prevent the erroneous storage. Although there is a possibility that correction operations actually performed on the pallet 13 are assumed to be unfinished while the time period $t_s$ lapses, repetition of the finished correction can be acceptable. It is an erroneous recognition of the unfinished correction that must be avoided.

Figure 21:
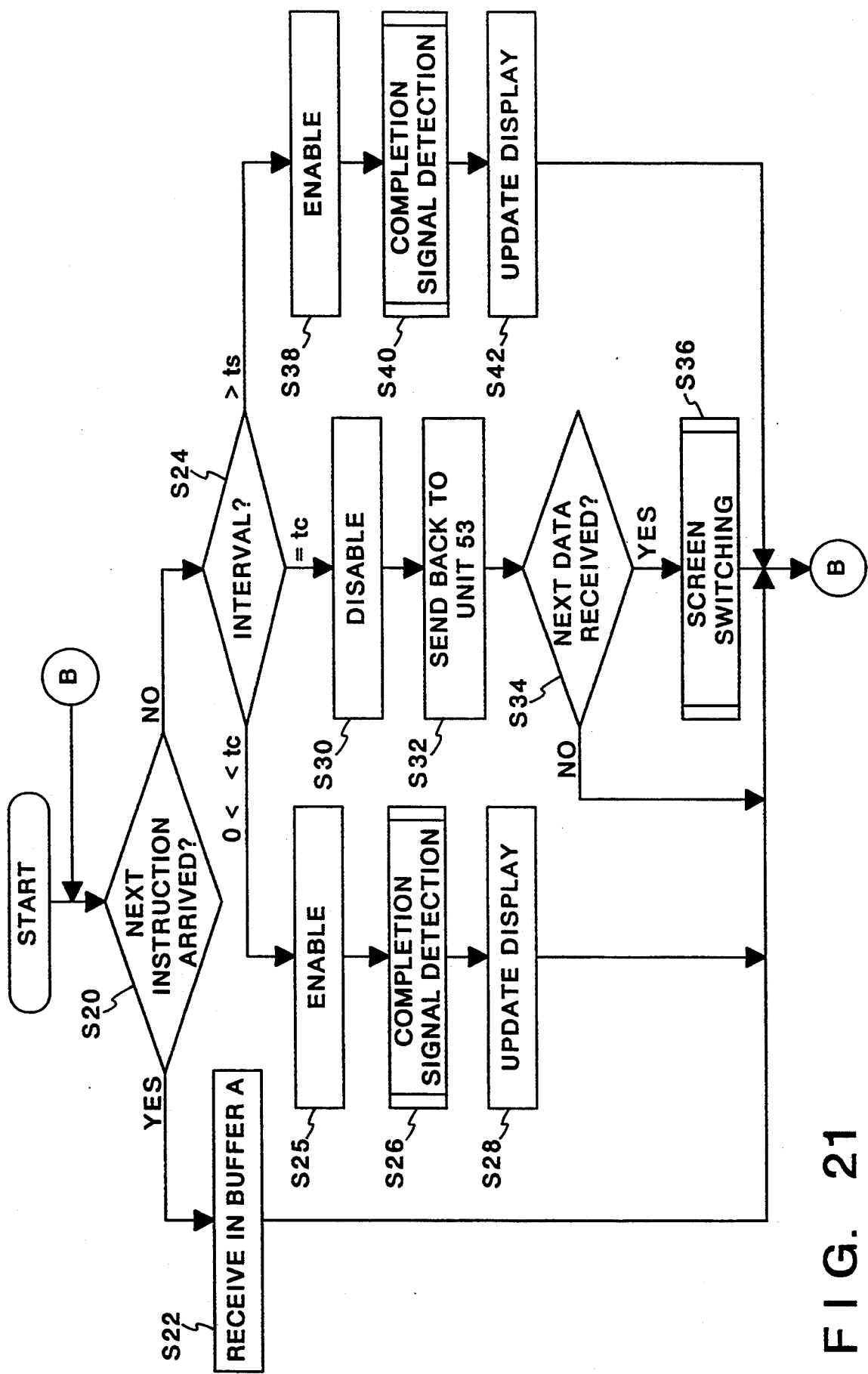

FIG. 21 shows a sequence of control of the display controller 70 at a correction station.

In step S20 in FIG. 21, a check is made to determine whether correction operation instructions for the next pallet from the distribution unit 53 has arrived. When the instructions have arrived, it is stored in the area A in FIG. 19. This area A is a storage area in which instruction data for the next pallet is stored; the area B is a storage area for instruction data for a pallet on which correction operations are currently being performed at the station.

The display controller 70 monitors the encoder 75 (FIG. 12). The display controller 70 transfers control to different steps depending upon the value of the encoder 75, for example, to step S30, to step S25, or to step S40. The value of the encoder becomes "0" when the next pallet causes a limit switch LS turned on.

While the output of the encoder indicates that elapsed time since the limit switch LS is turned on is not greater than $t_c$, the display controller 70 enables the detection of the completion signals in step S25, confirms the completion of the correction operations in step S26, sets flags $F_c$ (corresponding to places where correction operations were finished to "1" in step S28) so that, as mentioned earlier, the positions where correction operations finished is displayed from in red to in black. Operations in steps S26 to S28 are correction operations for the existing pallet (in an example in FIG. 20, the pallet 13) rather than a pallet which has newly arrived (in an example in FIG. 20, the pallet 13').

When the next pallet 13' moves to a position $t_c$, the controller 70 disables the detection of the completion signals in step S30. Next, in step S32, instruction data for the existing pallet (pallet 13) in the area B in FIG. 19 is sent back to the distribution unit 53. The instruction data which is sent back will be sent to the next correction station after any necessary reconstruction of the instructions are made, as described above (steps S10 to S20 in FIG. 17).

In step 34, if the display controller 70 has received a correction operation instructions, the screen will be switched in step S36.

Since the detection of the completion signals is disabled while after the new pallet enters the area of the station it is between position $t_c$ and position $t_s$, the completion of correction operations for the pallet is prevented from being stored (explained in conjunction with FIG. 20 (d)).

When the new pallet enters the area of the station and exceeds the position $t_s$, the detection of the completion signals is enabled in step S38, and the completion of correction operations will be detected in steps S40 and S42. Then, the screen is switched correspondingly.

FIG. 22 is a detailed flowchart of a sequence of switching screens in step S36. In step S50 in FIG. 22, a sequence counter is reset to "1". This sequence counter is a counter for indicating a place where a correction operation is currently being performed. The value of the counter being "1" corresponds to the correction operation sequence number ① in FIG. 19. In step S52, in order to change correction operation instructions from old one to new one, data of the area A in FIG. 19 is moved to the area B. In step S54, the screen is displayed based on this new instruction data.

Figure 23:
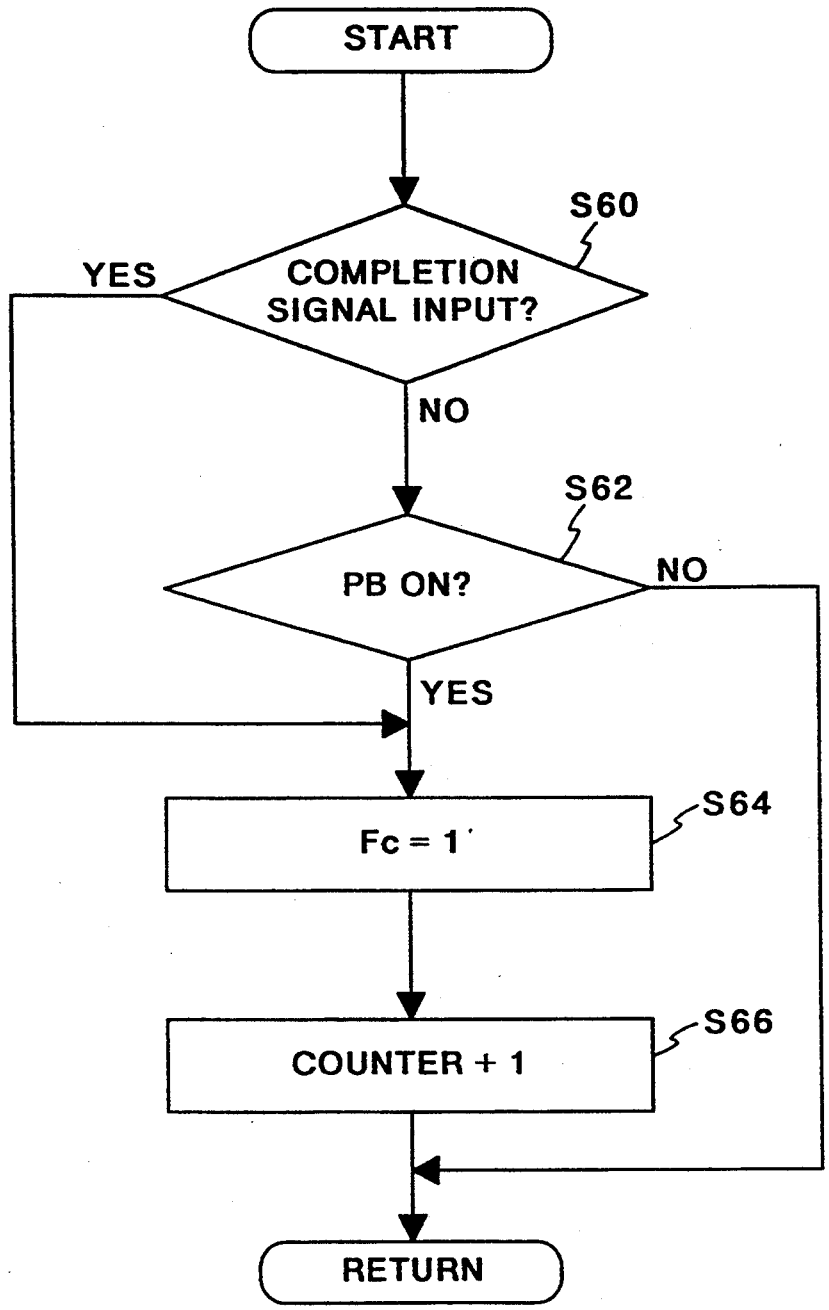

FIG. 23 shows a detailed sequence of the detection of the signal indicating the completion of operations performed in steps S26 and S40 in FIG. 21. That is, in step S60, it is checked whether a completion signal is input from the torque wrench controller 73. In step S62, it is checked whether button PB is being pressed. If either one of the states is detected, the flag $F_c$ for indicating that the correction operation has been completed is set to "1" in step S64. At this time, the flag $F_c$ is indexed by the sequence counter. In step S66, the sequence counter is incremented by 1. In this way, as individual correction operations are finished, corresponding flags $F_c$ become "1". In correspondence to the flag $F_c$, corresponding places on the CRT 7 are changed to a display in black, and the sequence counter is incremented.

In the above explanation, operations performed mainly at the R/D unit 53a and at each of the stations of the upper-portion correction station group 1D have been explained. The same applies to the R/D unit 53b and at each of the stations of the lower-portion correction station group 1F.

Carrying out Assembly-Finished Automobile Bodies

When the assembly of all the component parts of the upper and lower portions of an automobile as well as the correction operations for the assembled sections have been completed in the above way, the pallet 13 supporting the finished body 6 is transported to station #17, and the transportation and arrival of the pallet 13 is timely detected by limit switches $LS_{13}$ and $LS_{14}$. The pallet 13 further moves to assembling station #28 where it is mounted on the lifter, then it finally moves to assembling station #29, in which it is suspended by a hanger frame and is supported by the guide rail 3b, by means of which assembly-finished automobile bodies are sent back, of the automobile body transport line 3 mentioned above, and is then transported in a direction of the arrow in FIG. 1.

As a result, the pallet 13 at assembling station #29 becomes empty with no load. The work pallet 13 is then transported to assembling station #30 of the assembly parts subpallet installation station group 1H, in which each of the front and back subpallets 5a and 5b are removed in a lateral direction (toward the upper portion shown in FIG. 1). The front suspension and the engine 14 are installed on the front subpallet 5a, and the rear suspension 15 is installed on the back subpallet 5b on the side of the assembly parts installation station group 1H. At the time when the installation of assembly parts, such as the engine 14 or the suspension 15, is finished, the work pallet from which the subpallets 5a and 5b have been removed arrives at the next assembling station #31 and awaits. Subpallets 5a and 5b with the engine 14 and suspension 15 are fitted in the waiting work pallet. The pallet is transported to station #4 of the part correction station group 1B, and the above-described assembly and correction operations are repeated. In the above way, operations of assembling automobiles are performed efficiently.

Modifications

Many modifications of the present invention can be made within the spirit and scope thereof.

M-1:

Although the exchange of data with the data carrier 60 is performed by using microwaves in the above embodiments, the data can be exchanged by means of other mediums, such as a magnetic recording medium or a laser light beam.

M-2:

In the above embodiments, correction operations at correction stations are mainly operations by means of torque wrenches. Needless to say, however, the present invention can be applied to correction operations by means of the other tools. Although in the above embodiments the completion of a correction operation using tools is automatically detected, the completion of all the correction operations may be made by confirmation by an operator. That is, the completion of a correction operation cannot be confirmed before he presses a prescribed button for every correction operation.

M-3:

Although in the above embodiments the switching of the correction operation instruction screen is automatically performed by the system, it may be changed so that the screen is changed after confirmation by the operator.

M-4:

In the above embodiments, correction operation instruction data is prepared for each pallet (see FIG. 19). For this reason, the instruction data moves from correction station to correction station as the pallet moves. The instruction data may be formatted into sub-instruction-data by correction station basis so that each subinstruction is sent for the corresponding correction station.

M-5:

Although in the above embodiments operations at a correction station are performed mainly by an operator, the present invention is not limited to this, and includes correction operations by means of an automatic machine.

Thus, modifications described below are proposed. That is, the distribution unit 53 prepares correction operation instruction data for a certain pallet for each station and this data is distributed to each station. As a result, at each station, correction operations to be performed at such station are queued for each pallet.

Figure 25:
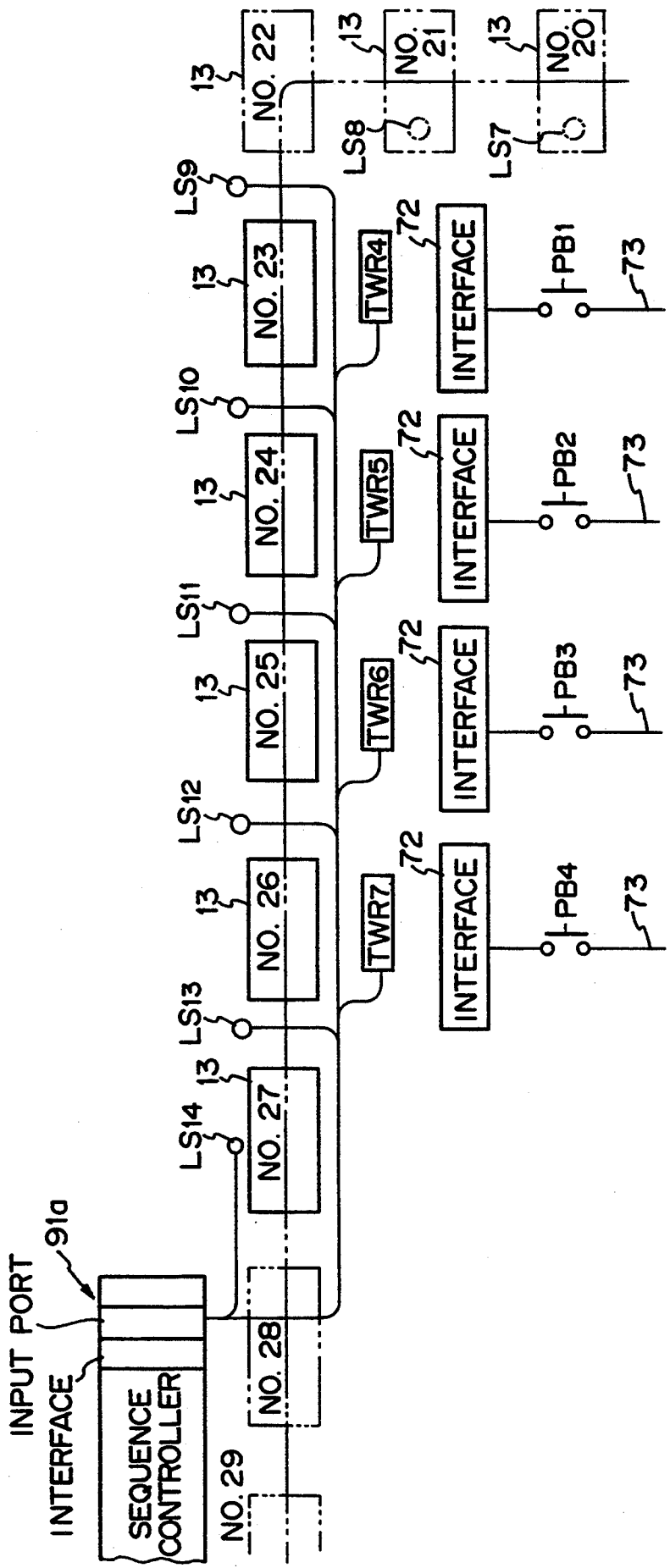

In this case, what is of matter is the confirmation of the completion of correction operations at each station. In this modification, this confirmation is performed by the distribution unit 53. Each station sends a correction operation completion message over the communication line, as shown in FIGS. 24 and 25. Reference numerals 91a and 91b in FIGS. 24 and 25 each denote the transmission format of the message.

The present invention is not limited to the above embodiments and various changes and embodiments can be made within the spirit and scope of the present invention. Therefore, to apprise the public of the scope of the present invention the following claims are made.

What is claimed is:

1. A production process administration system for controlling production processes which are performed on a production line having an assembling station line and a correction station line which is connected to the assembling station line, comprising:

the assembling station line along which a plurality of assembling stations are provided at which production operations are performed;

the correction station line along which at least one correction station is provided at which a correction operation is performed, said correction station line being connected to the assembling station line so that the correction station line and assembling station line form a single line;

a work that moves along said correction station line and successively said assembling station line;

a data carrier that moves with the work and that is capable of recording data;

said plurality of assembling stations each having means for detecting defects of said production operations and for writing a nature of the defects in said data carrier;

means for advancing the work together with the data carrier along the assembling station line and toward the correction station line;

correction instruction distribution means, provided at a data collection point between the last assembling station and the first correction station, for reading the contents of said data carrier when the data carrier arrives at the point, for preparing a correction instructions according to a defect which is read out of the data carrier, and for sending instructions to the at least one correction station; and said at least one correction station at which correction operations are performed based on the correction instructions sent from the instruction means.

2. A system according to claim 1, wherein said correction station includes a display means for displaying said correction instructions.

3. A system according to claim 2, wherein said correction instructions include information specifying the locations of the defects and tools to be used for correcting the defects.

4. A system according to claim 3, wherein said tools used for correction are manually operated by an operator.

5. A system according to claim 1, wherein said data carrier includes;

a microwave communication circuit;

a circuit for receiving data from the assembling stations for writing the data into a RAM; and a circuit for reading the data of the RAM and for sending the data to the reading means of the correction instruction distribution means through the microwave communication circuit.

6. A system according to claim 5, wherein said assembling station has a circuit for sending data to said data carrier by means of microwaves.

7. A system according to claim 5, wherein said correction instruction distribution means has a circuit for receiving data from said data carrier by means of microwaves.

8. A system according to claim 1, wherein said correction station line has a plurality of correction stations.

9. A system according to claim 8, wherein said correction instruction distribution is provided in an instruction station disposed between said assembling station and said correction station line, the correction instruction distribution means of the instruction station comprising:

a first database for storing location information of the defects and information about corresponding tools required for correction of the defects;

a second database for storing information about tools provided in said plurality of correction stations;

search means for searching said first and second databases and for preparing as said correction instructions the combination of defects to be corrected at each correction station and the tools used for correction at the correction station; and distribution means for distributing said correction instructions to each correction station through a communication line.

10. A system according to claim 8, wherein each correction station includes a display means for displaying the content of the correction instructions.

11. A system according to claim 10, wherein said correction instructions include information specifying the location of portions to be corrected, information on the tools used for correcting each of the correction portions, and information on the sequence of individual correction operations for said plurality of the correction portions.

12. A system according to claim 8, wherein said correction instruction distribution means sends correction instructions to the correction station positioned next to the instruction station and wherein each correction station detects the completion of individual correction operations, changes the correction instructions of the unfinished correction operations to instructions for changes to be made at the next correction station, and sends the changed correction instructions to said next station.

13. A system according to claim 9, wherein said instruction station sends correction instructions to the next correction station positioned next to it and wherein each correction station includes a means for determining whether or not the work has passed an area within its territory and a means for passing said correction instructions to the next station when said work has passed beyond the area.

14. A system according to claim 13, wherein when said correction instructions are passed from a preceding station, each of said correction stations displays this transferred correction instructions after delaying the display by a predetermined amount of time.

15. A system according to claim 13, wherein each correction station includes a means for detecting the status of completion of individual correction operations at each station and a means for disabling said detection means during a set amount of time when said correction instructions are passed from the preceding station.

16. A system according to claim 1, wherein operations at the correction stations are performed manually.

17. A system according to claim 8, wherein correction instructions which are to be performed at one correction station do not include those which have been performed at the preceding correction stations.

18. An administration method for administrating production processes which are performed on a production line having an assembling station line and a correction station line which is connected to the assembling station line so that the correction station line and assembling station line form a single line, the assembling station line being provided with a plurality of assembling stations at which production operations are performed, and the correction station line being provided with at least one correction station, the method comprising the steps of:

moving a work and data carrier that move along said assembling stations while forming data indicating defects occurred when production operations are performed at said assembling stations and recording the defect data onto the data carrier;

reading the defect data from said data carrier at a data collection point between the last assembling station and the first correction station;

preparing correction instructions according to a defect which is read out of the data carrier, and sending the instructions to the at least one correction station; and performing correction operations at said one correction station on the basis of the correction instructions received thereat.

* * * * *

UNITED STATES PATENT AND TRADEMARK OFFICE
CERTIFICATE OF CORRECTION

PATENT NO. : 5,341,304

DATED : August 23, 1994

INVENTOR(S) : SAKAMOTO et al.

It is certified that error appears in the above-indentified patent and that said Letters Patent is hereby corrected as shown below:

Column 6,   line 56, "Correction" should be --correction--
Column 8,   line 3, delete "...".
Column 10,  line 52, delete "the" (second occurence)
Column 11,  line 3, after "stations" insert --of--.
              line 57, delete "of" (second occurence).
Column 14,  line 38, after "example" insert --,--;
              line 56, "assembly" should be --assembling--.
Column 20,  line 27, "correct ion" should be --correction--.
Column 24,  line 48 (claim 9), after "distribution" insert --means--;
              line 49 (claim 9), after "station" (second occurence) insert --line--.

Signed and Sealed this

Twenty-fifth Day of July, 1995

Attest:

BRUCE LEHMAN

*Attesting Officer*      *Commissioner of Patents and Trademarks*